US012601830B2

(12) United States Patent
Ye

(10) Patent No.: US 12,601,830 B2
(45) Date of Patent: Apr. 14, 2026

(54) METHOD AND APPARATUS FOR OBTAINING LOCATION INFORMATION USING RANGING BLOCK AND RANGING ROUNDS

(71) Applicant: Red Point Positioning Corporation, Boston, MA (US)

(72) Inventor: Zhenzhen Ye, Westford, MA (US)

(73) Assignee: Red Point Positioning Corporation, Boston, MA (US)

( * ) Notice: Subject to any disclaimer, the term of this patent is extended or adjusted under 35 U.S.C. 154(b) by 388 days.

(21) Appl. No.: 17/834,602

(22) Filed: Jun. 7, 2022

(65) Prior Publication Data

US 2022/0390586 A1     Dec. 8, 2022

Related U.S. Application Data

(60) Provisional application No. 63/208,099, filed on Jun. 8, 2021.

(51) Int. Cl.
G01S 13/76          (2006.01)

(52) U.S. Cl.
CPC ................................. G01S 13/767 (2013.01)

(58) Field of Classification Search
None
See application file for complete search history.

(56) References Cited

U.S. PATENT DOCUMENTS

| | | | |
|---|---|---|---|
| 2013/0038490 A1* | 2/2013 | Garcia | G01S 13/74 |
| | | | 342/451 |
| 2014/0282257 A1* | 9/2014 | Nixon | G05B 15/02 |
| | | | 715/835 |
| 2020/0154473 A1* | 5/2020 | Padaki | H04W 72/0446 |
| 2024/0114480 A1* | 4/2024 | Duan | H04L 5/14 |

OTHER PUBLICATIONS

"IEEE Standard for Low-Rate Wireless Networks Amendment 1: Enhanced Ultra Wideband (UWB) Physical Layers (PHYs) and Associated Ranging Techniques", LAN/MAN Standards Committee, Jun. 4, 2020, 174 pages.
"IEE Standard for Low-Rate Wireless Networks", LAN/MAN Standards Committee, May 6, 2020, 800 pages.

* cited by examiner

*Primary Examiner* — Resha Desai
*Assistant Examiner* — Brandon James Henson
(74) *Attorney, Agent, or Firm* — Guntin & Gust, PLC; Mark Wilinski

(57) ABSTRACT

Aspects of the subject disclosure may include, for example, generating, by a server operating as a controller in a locating system, a schedule for a group of anchors operating as controlees in the location system that is utilized for determining position information for one or more mobile devices, where the schedule is for a ranging block period; and provisioning, by the server, the schedule to the group of anchors to cause anchor pairs of the group of anchors to wirelessly transmit REQ messages and RSP messages to each other according to the schedule operating as an initiator and a responder, respectively, wherein the one or more mobile devices overhear the REQ messages and RSP messages being transmitted between the anchor pairs and calculate a TDOA measurement based on the REQ messages and RSP messages. Other embodiments are disclosed.

20 Claims, 23 Drawing Sheets

900

300

600

700

902A

REQ

RSP

902B

REQ

RSP

M

901M

900

Ranging block

| Ranging round 0 | Ranging round 1 | Ranging round 2 | Ranging round 3 | ...... | Ranging round $N-1$ |
|---|---|---|---|---|---|

| Ranging slot 0 | Ranging slot 1 | Ranging slot 2 | ...... | Ranging slot $M-1$ |
|---|---|---|---|---|

925

1000

1100

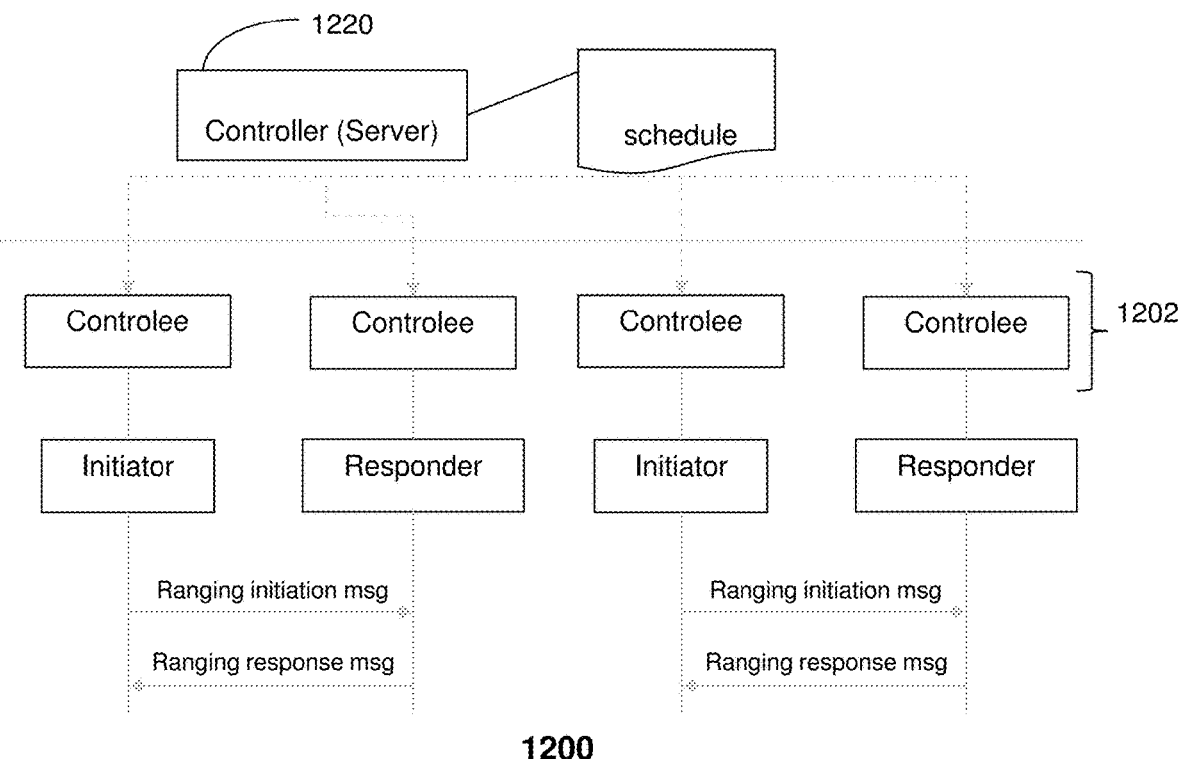

1220

Controller (Server)    schedule

Controlee    Controlee    Controlee    Controlee    } 1202

Initiator    Responder    Initiator    Responder

Ranging initiation msg    Ranging initiation msg

Ranging response msg    Ranging response msg

Controller    Controlee    Controller    Controlee

Ranging Control Message    Ranging Control Message

Initiator    Responder    Responder    Initiator

Ranging initiation message    Ranging initiation message

Ranging response message    Ranging response message

FIG. 22B

METHOD AND APPARATUS FOR OBTAINING LOCATION INFORMATION USING RANGING BLOCK AND RANGING ROUNDS

CROSS REFERENCE TO RELATED APPLICATIONS

The present application claims the benefit of priority to U.S. Provisional Application No. 63/208,099, filed Jun. 8, 2021. The contents of each of the foregoing are hereby incorporated by reference into this application as if set forth herein in full.

FIELD OF THE DISCLOSURE

The subject disclosure relates to a method and apparatus for obtaining location information using ranging block and ranging rounds.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, trajectory of objects, speed of objects, positions of objects, or combinations thereof.

BRIEF DESCRIPTION OF THE DRAWINGS

Reference will now be made to the accompanying drawings, which are not necessarily drawn to scale, and wherein:

FIGS. 14A, 14B, 14C, 13D and 14E are block diagrams illustrating exemplary, non-limiting embodiments of peer-to-peer communications for determining a location of a mobile tag in accordance with various aspects described herein.

FIGS. 22A-22B are block diagrams illustrating an exemplary, non-limiting embodiment for determining location information of mobile tags using ranging block and ranging rounds in accordance with various aspects described herein.

DETAILED DESCRIPTION

The subject disclosure describes, among other things, illustrative embodiments for determining location information such as between a mobile tag and one or more anchors. Other embodiments are described in the subject disclosure.

In one embodiment, a server can include a processing system including a processor; and a memory that stores executable instructions that, when executed by the processing system, facilitate performance of operations. The processing system can generate a schedule for a group of anchors operating as controlees in a location system that is utilized for determining position information for one or more mobile devices. The processing system can provision the schedule to the group of anchors to cause anchor pairs of the group of anchors to wirelessly transmit REQ messages and RSP messages to each other according to the schedule operating as an initiator and a responder, respectively, wherein the one or more mobile devices also receive the REQ messages and RSP messages being transmitted between the anchor pairs and calculate a TDOA measurement based on the REQ messages and RSP messages.

In one embodiment, a non-transitory machine-readable medium can include executable instructions that, when executed by a processing system including a processor operating from a mobile device, facilitate performance of operations. The processing system can obtain REQ messages and RSP messages being wirelessly transmitted between anchor pairs of a group of anchors according to a schedule that is generated by and provisioned by a server to the group of anchors, wherein the anchor pairs operate as an initiator and a responder, respectively, in a location system; and can calculate a TDOA measurement based on the REQ messages and RSP messages.

In one embodiment, a method can include generating, by a server operating as a controller in a locating system, a schedule for a group of anchors operating as controlees in the location system that is utilized for determining position information for one or more mobile devices; and provisioning, by the server, the schedule to the group of anchors to cause anchor pairs of the group of anchors to wirelessly transmit REQ messages and RSP messages to each other according to the schedule operating as an initiator and a responder, respectively, wherein the one or more mobile devices overhear the REQ messages and RSP messages being transmitted between the anchor pairs and calculate a TDOA measurement based on the REQ messages and RSP messages.

Figure 1:
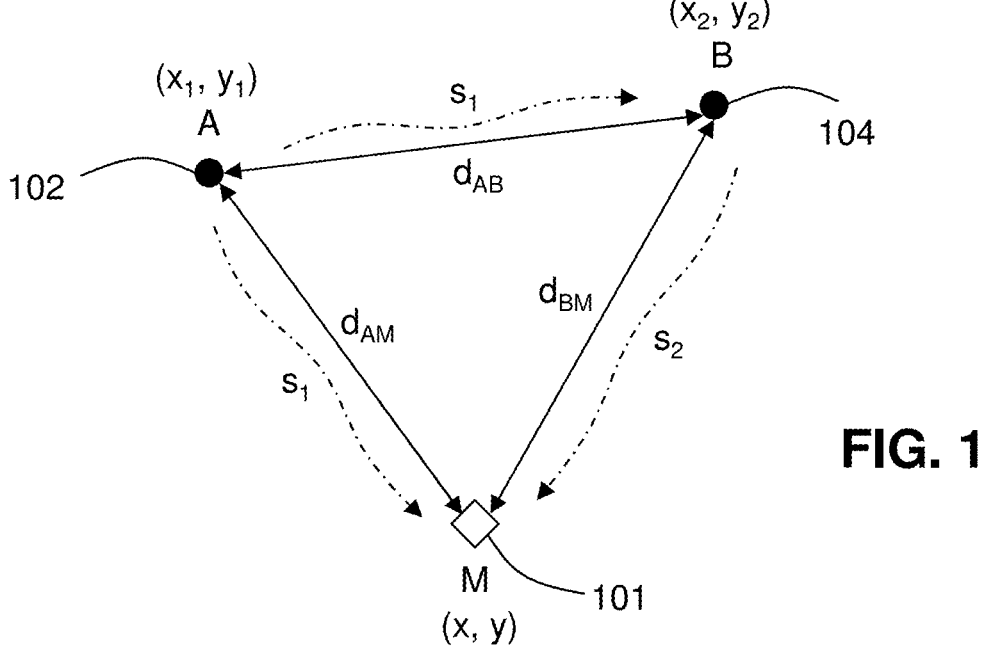
FIG. 1 is a block diagram illustrating an exemplary, non-limiting embodiment of a mobile tag and anchors for determining location information between the mobile tag and the anchors in accordance with various aspects described herein.
Figure 2:
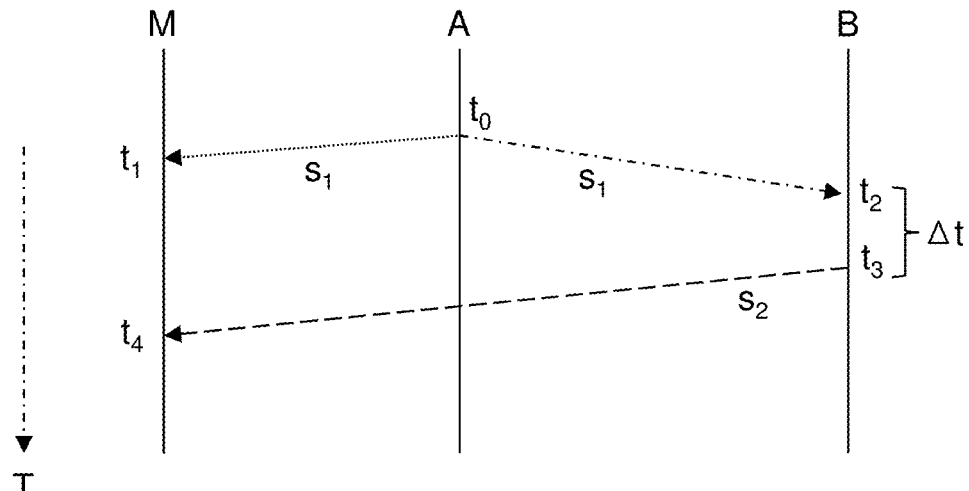
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, anchor 102 can be configured to transmit a first wireless signal (s$_1$) that can be received by anchor 104 and the mobile tag 101. The timing of transmission by anchor 102 and reception by the mobile tag 101 and anchor 104 of the first wireless signal (s$_1$) is depicted in FIG. 2.

In an embodiment, anchor 102 transmits the first wireless signal (s$_1$) at time t$_0$, which in turn is received by the mobile tag 101 at time t$_1$ and anchor 104 at time t$_2$. Anchor 104 can be configured to transmit a second wireless signal (s$_2$) at time t$_3$, which is received by the mobile tag 101 at time t$_4$. The mobile tag 101 can be configured to use a time difference of arrival (TDOA) measurement technique based on the first and second wireless signals (s$_1$, s$_2$) to determine location information between the mobile tag 101 and the anchors 102 and 104 as will be described below.

In an embodiment, anchors 102 and 104 are stationary. Accordingly, their x-y coordinates and the distance between anchors 102 and 104 (d$_{AB}$) can be made known to the mobile tag 101 either by a look-up table provisioned into a memory of the mobile tag 101 or by including such information in the first wireless signal (s$_1$), which can then be obtained by the mobile tag 101. Additionally, the mobile tag 101 can be configured to include in its look-up table the receive time and transmit time (t$_2$, t$_3$) of anchor 104 and/or a time difference between these times ($\Delta t=t_3-t_2$), or can receive this information in the second wireless signal (s$_2$) transmitted by anchor 104. The equations that follow can be used to calculate a first possible location of the mobile tag 101 relative to anchor pairs 102, 104.

The distance between anchor 102 and the mobile tag can be represented as, $$d_{AM} = c(t_1 - t_0),$$ (EQ 1)

where c is the speed of light constant. Similarly, the distance from anchor 102 to anchor 104 can be represented as, $$d_{AB} = c(t_2 - t_0).$$ (EQ 2)

Additionally, the distance from anchor 104 to the mobile tag 101 can be represented as, $$d_{BM} = c(t_4 - t_3).$$ (EQ 3)

The total distance traveled by the first wireless signal (s$_1$) from anchor 102 to anchor 104 and the second wireless signals (s$_2$) from anchor 104 to mobile tag 101 can be represented as, $$d_{AB} + d_{BM} = c(t_2 - t_0 + t_4 - t_3).$$ (EQ 4A)

To eliminate variable t$_0$, equation EQ1 can be subtracted from equation EQ 4A, resulting in, $$d_{AB} + d_{BM} - d_{AM} = c(t_2 - t_1 + t_4 - t_3).$$ (EQ 4B)

Substituting $\Delta t=t_3-t_2$ into EQ 4B results in equation, $$d_{AB} + d_{BM} - d_{AM} = c(t_4 - t_1 - \Delta t).$$ (EQ 4C)

Since d$_{AB}$ is a constant known to the mobile tag 101 and the time variables of the factor c(t$_4$-t$_1$-$\Delta$t) are also known to the mobile tag 101, EQ 4C can be rewritten as, $$d_{BM} - d_{AM} = \Delta d_1,$$ (EQ 5)

where $\Delta d_1=c(t_4-t_1-\Delta t)-d_{AB}$, which are constants known to mobile tag 101. Furthermore, in an example of two-dimensional (2D) space, the distance between anchor 102 and the mobile tag 101 can be represented as, $$d_{AM} = \sqrt{(x-x_1)^2 + (y-y_1)^2},$$

and the distance between anchor 104 and the mobile tag 101 can be represented as, $$d_{BM} = \sqrt{(x-x_2)^2 + (y-y_2)^2}.$$

Substituting $d_{AM}$ and $d_{BM}$ in EQ 5 results in the following equation, $$\sqrt{(x-x_2)^2 + (y-y_2)^2} - \sqrt{(x-x_1)^2 + (y-y_1)^2} = \Delta d_1. \qquad (\text{EQ 6})$$

Figure 3:
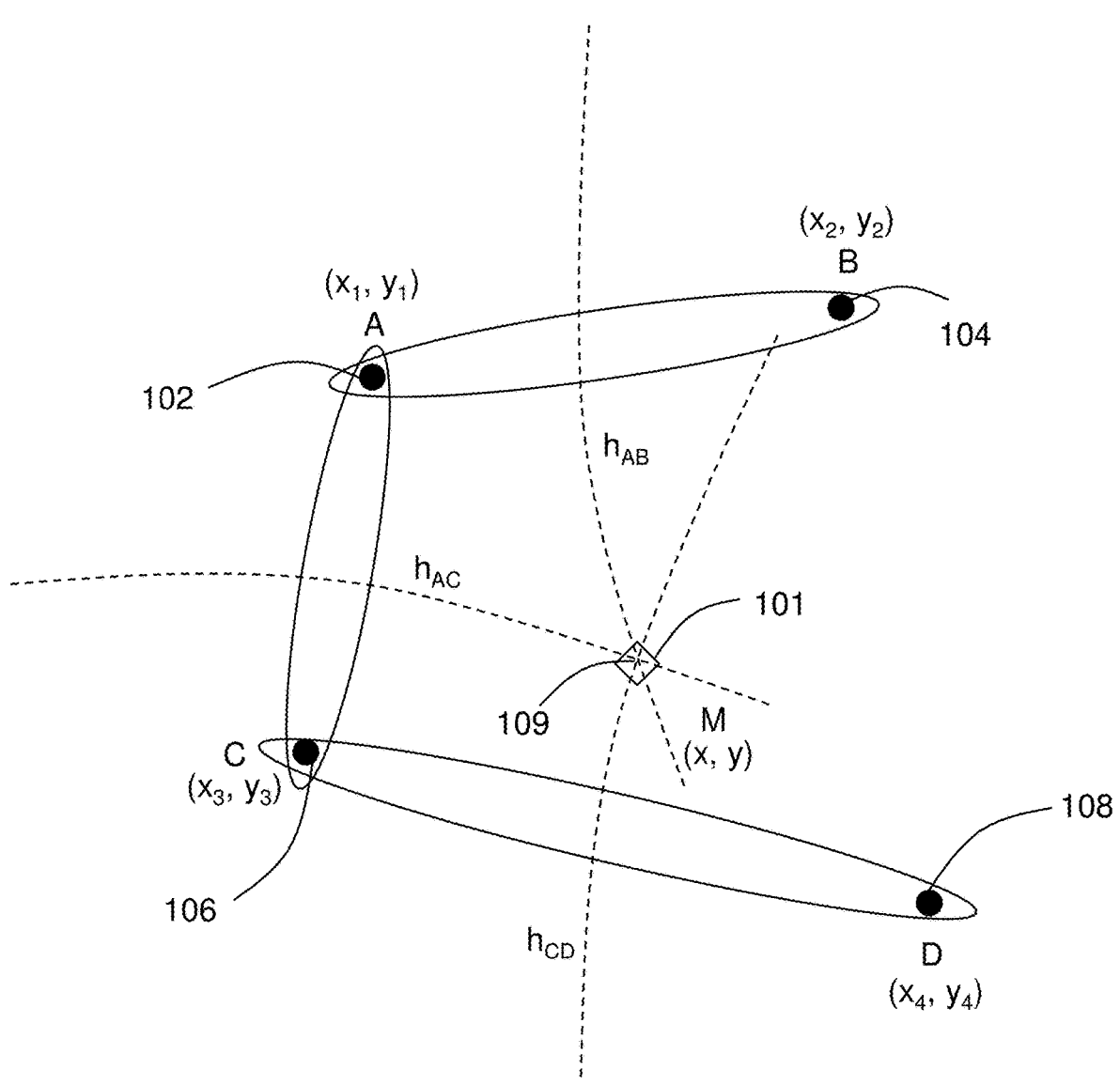
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors pairs 102, 104. Such a hyperbolic curve can be represented as, $$h_{AB} = \Delta d_1, \qquad (\text{EQ 7A})$$

where $h_{AB} = \sqrt{(x-x_2)^2 + (y-y_2)^2} - \sqrt{(x-x_1)^2 + (y-y_1)^2}$. 101 can be further configured to perform the above calculation across other anchor pairs as depicted in FIG. 3. For example, the mobile tag 101 can be configured to determine a hyperbolic curve between anchors 102 and 106 (i.e., anchors A and C) resulting in equation, $$h_{AC} = \Delta d_2, \qquad (\text{EQ 7B})$$

where $\Delta d_2$ is a constant known to mobile tag 101, and where $h_{AC} = \sqrt{(x-x_3)^2 + (y-y_3)^2} - \sqrt{(x-x_1)^2 + (y-y_2)^2}$. Additionally, the mobile tag 101 can be configured to determine a hyperbolic curve between anchors 106 and 108 (i.e., anchors C and D) resulting in equation, $$h_{CD} = \Delta d_3, \qquad (\text{EQ 7C})$$

where $\Delta d_3$ is a constant known to mobile tag 101, and where $h_{CD} = \sqrt{(x-x_4)^2 + (y-y_4)^2} - \sqrt{(x-x_3)^2 + (y-y_3)^2}$. The intersection 109 of hyperbolic curves $h_{AB}$, $h_{AC}$ and $h_{CB}$ corresponding to equations EQ 7A-7C can provide a two-dimensional coordinate location (i.e., x, y) for the mobile tag 101 relative to anchors pairs 102 and 104 (anchors A/B), 106 and 108 (anchors A/C), 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchors 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
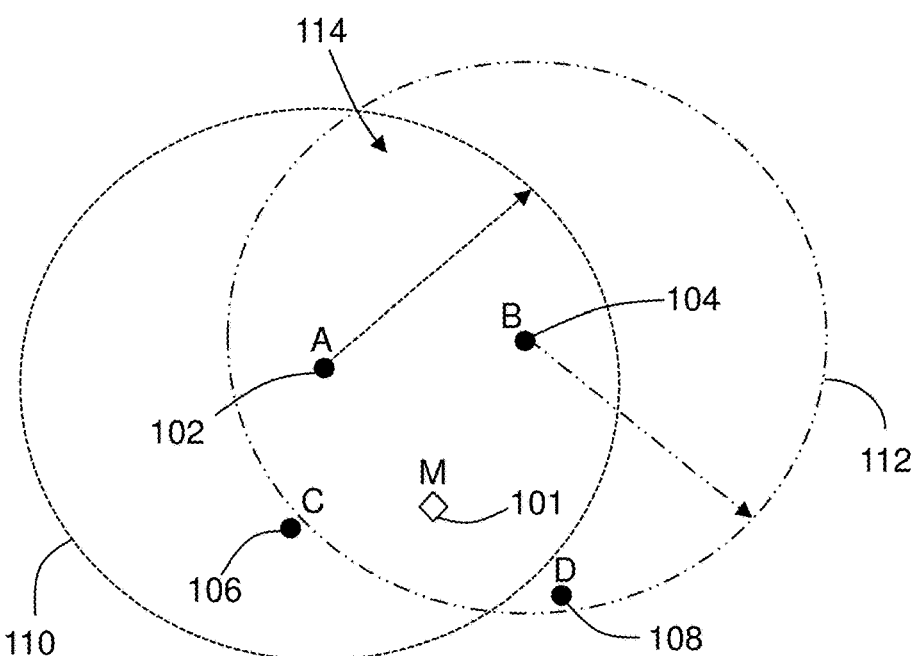
FIGS. 4A, 4B and 4C are block diagrams illustrating exemplary, non-limiting embodiments for selecting pairs of anchors in accordance with various aspects described herein.
Figure 4B:
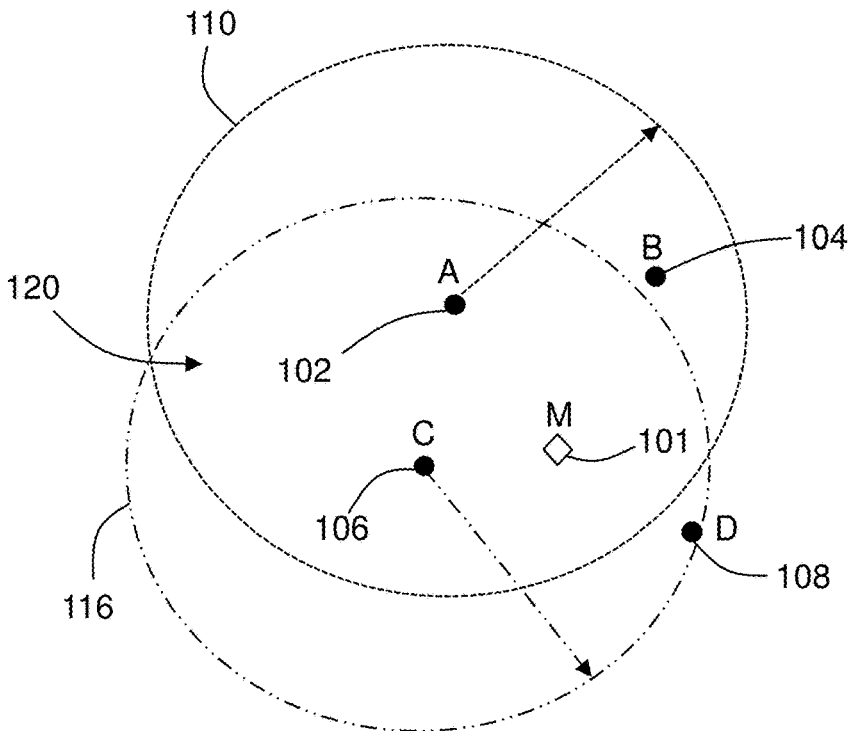
Figure 4C:
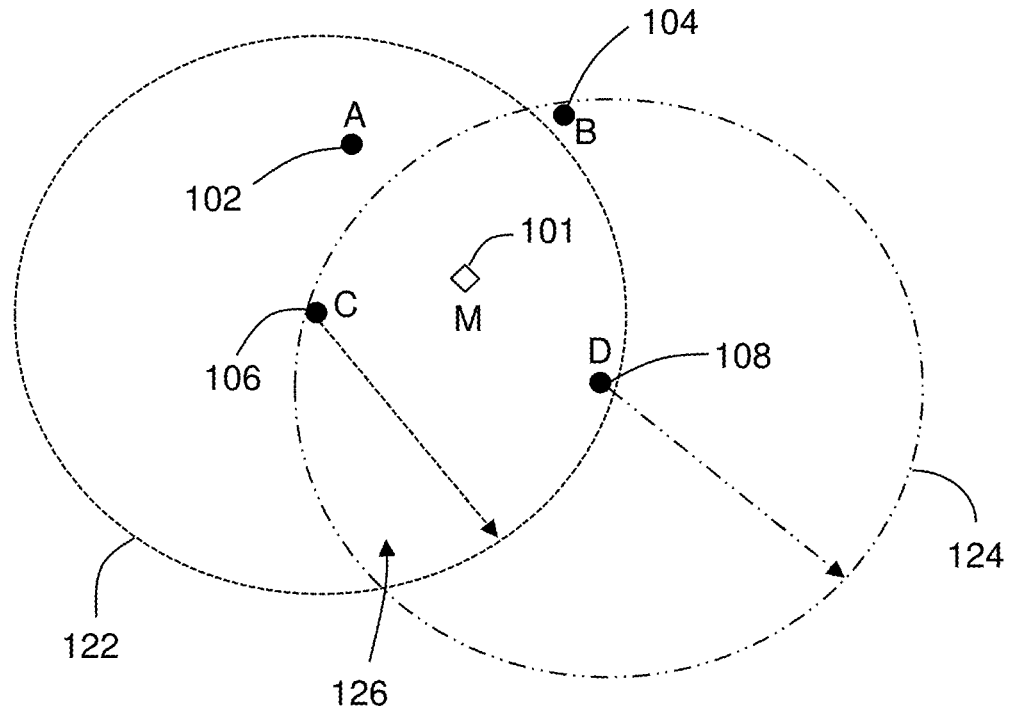

FIG. 4B shows that the coverage areas 110 and 116 of anchor pairs 102, 106 (anchors A/C), respectively, creates an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pairs 106, 108 (anchors C/D), respectively, creates an overlapping region 126 that encompasses anchors 106 and 108 and the mobile tag 101, thereby enabling the mobile tag 101 to calculate hyperbolic curve $h_{CD}$.

Figure 5:
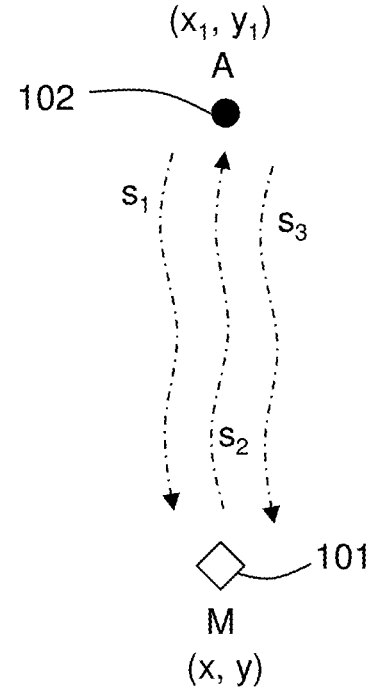
FIG. 5 is a block diagram illustrating an exemplary, non-limiting embodiment of a mobile tag and an anchor for determining location information between the mobile tag and the anchor in accordance with various aspects described herein.
Figure 6:
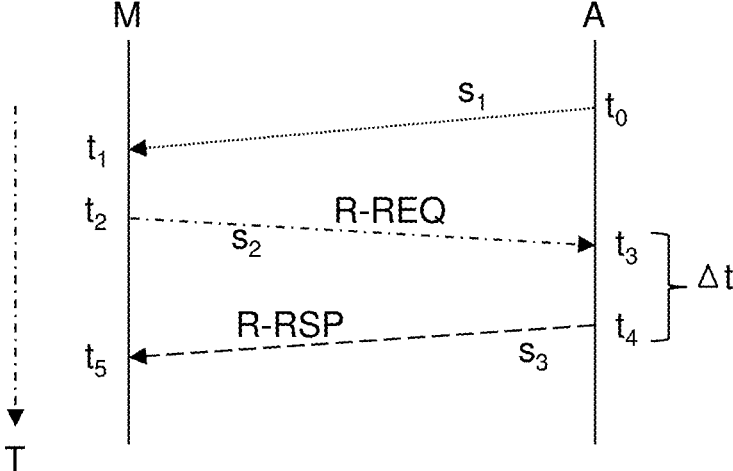
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, the process may begin at anchor 102 which transmits a first wireless signal ($s_1$), which is received at time ti. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r-trip} = d_{AM} + d_{MA},$$

where $d_{r-trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2).$$

Similarly, the distance from anchor 102 to the mobile tag 101 can be determined by, $$d_{AM} = c(t_5 - t_4).$$

With the above equations, the roundtrip distance can be rewritten as, $$d_{r-trip} = c(t_5 - t_4 + t_3 - t_2).$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r-trip}$ Substituting $\Delta t$ in $d_{r-trip}$ results in the formula, $$d_{r-trip} = c(t_5 - t_2 - \Delta t).$$

Since the values of $t_5$, $t_2$, and $\Delta t$ are known to the mobile tag 101, the mobile tag 101 can readily calculate $d_{r-trip}$. The mobile tag 101 can also calculate the distance from the mobile tag 101 to anchor 102 based on the formula, $$d_{MA} = d_{r-trip} / 2.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r-trip}$ calculations. Accordingly, the TW-TOA illustrated in FIG. 5 can be used by either the mobile tag 101 or anchors in other embodiments to calculate a relative distance between each other.

It will be appreciated that the TDOA and TW-TOA processes described above can also between mobile tags 101. For example, FIGS. 1-3, 4A-4C, and 5-6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
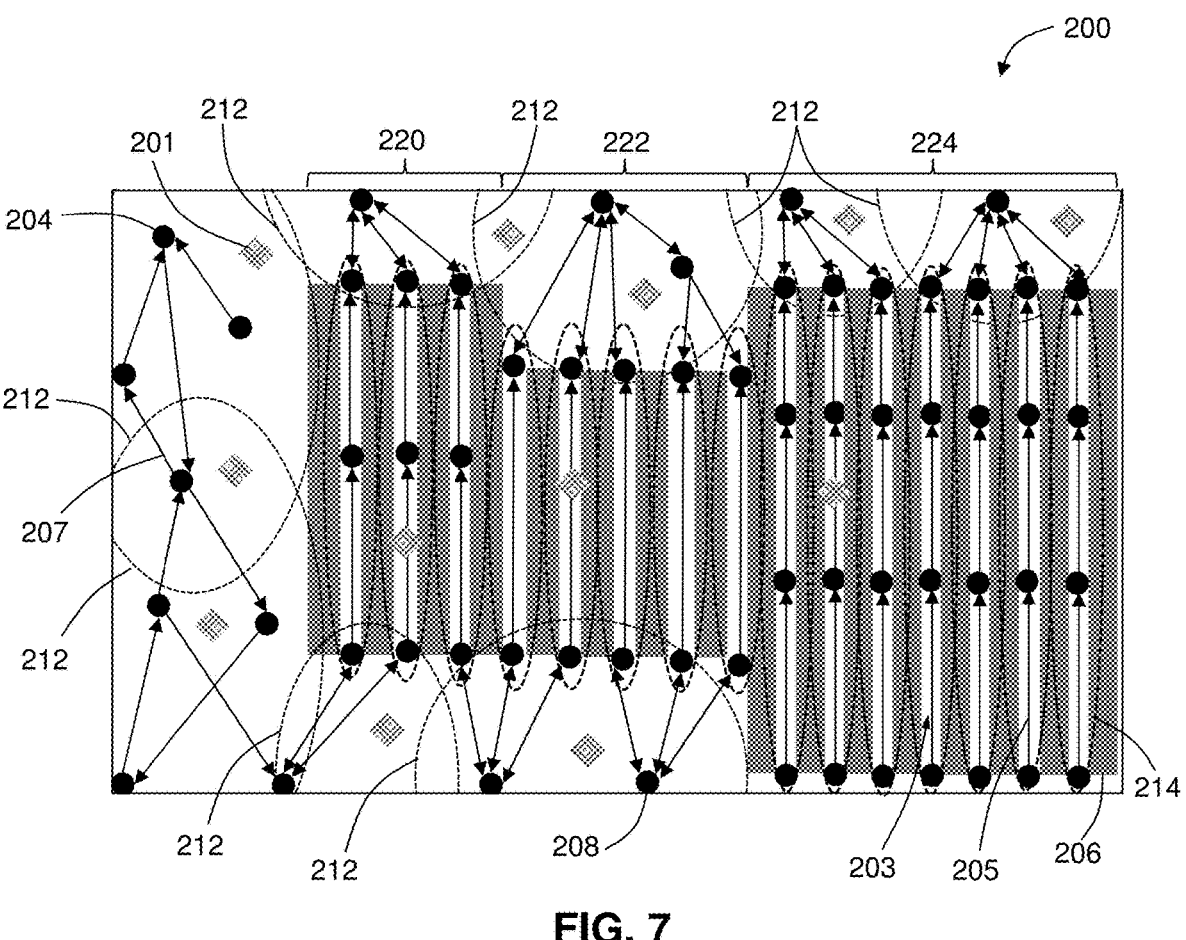
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure can be applied to. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 can be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
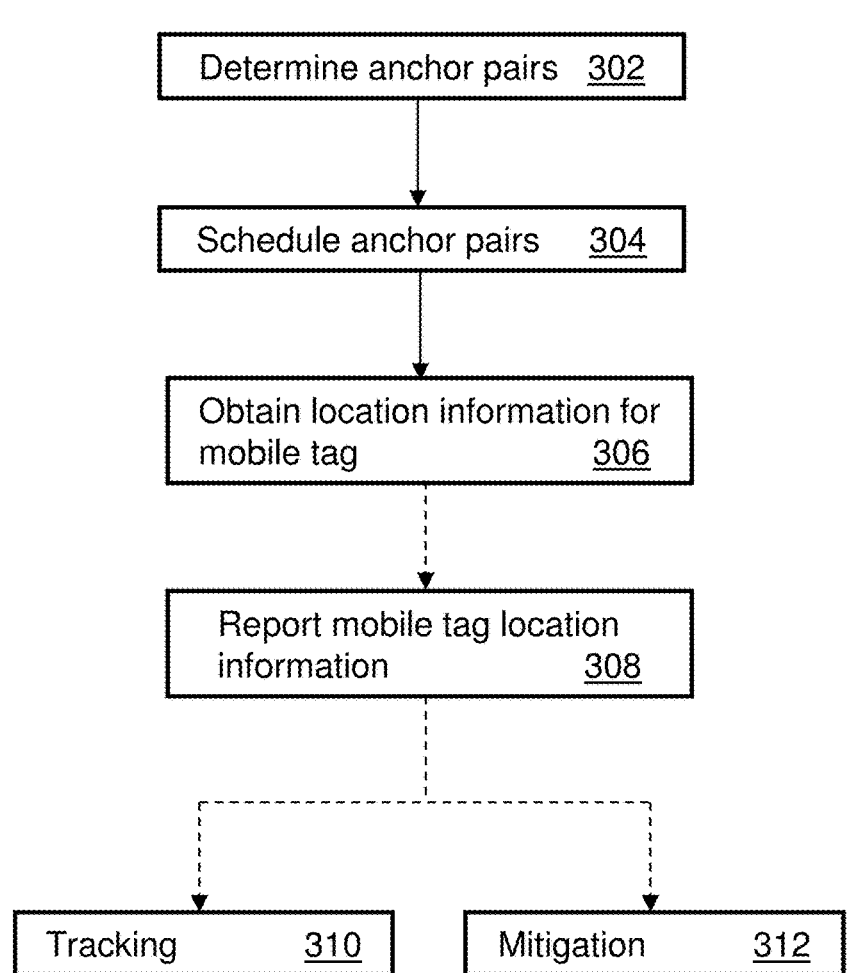
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system such as a server (described below in relation to FIG. 11) is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that other techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C.

The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
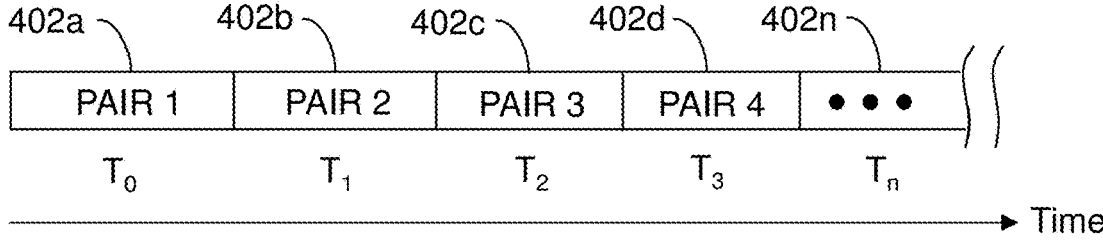
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$-$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$) Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 204 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($s_1$) an indication whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204.

Alternatively, the mobile tags 201 can be configured with a look-up table that includes the x-y coordinates of all anchors 204 in the demarcated area 200. The mobile tags 201 can obtain the lookup-table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
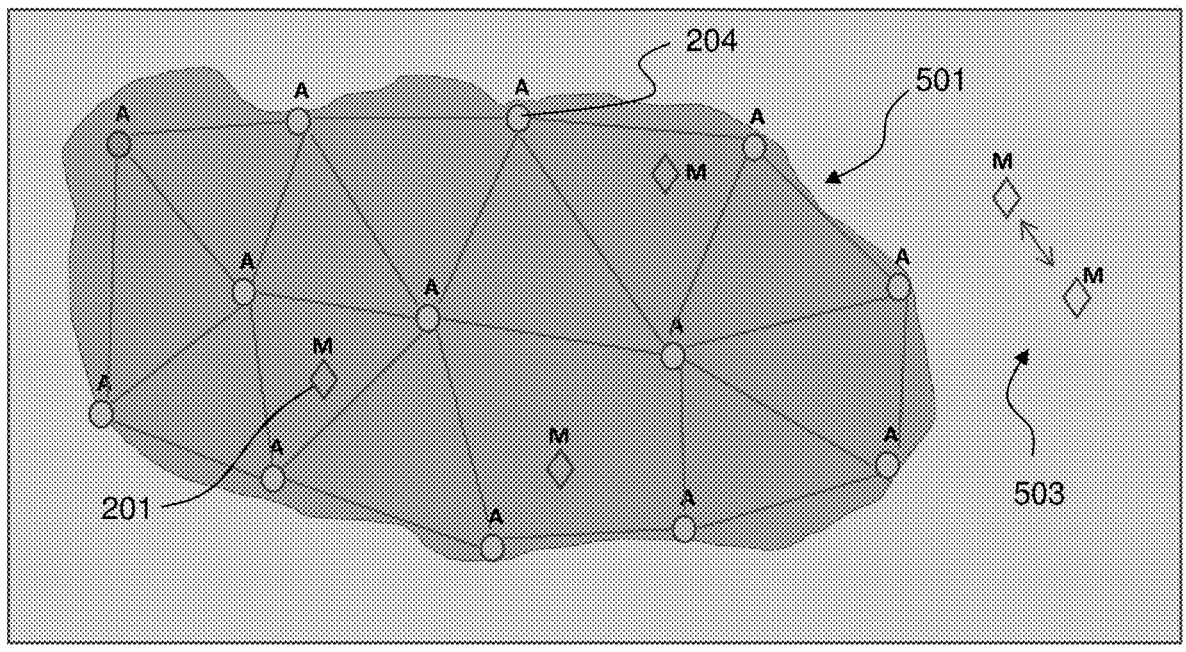
FIG. 10 is a block diagram illustrating an exemplary, non-limiting embodiment of environments where mobile tags can operate from in accordance with various aspects described herein.

FIG. 10 is a block diagram illustrating an exemplary, non-limiting embodiment of environments where mobile tags can operate from in accordance with various aspects described herein. Mobile tags 201 can at certain times operate within a network 501 of anchors 204 (such as described above in FIG. 7) to obtain their location as described above. However, users (or vehicles or other mobile devices) carrying a mobile tag 201 can transition to an open space 503 that is outside of the coverage of the network 501. When this occurs, the mobile tags 204 can be configured to transition to peer-to-peer communications (i.e., tag-to-tag communications) to continue to obtain location information relative to other mobile tags in the open space 503.

Figure 11:
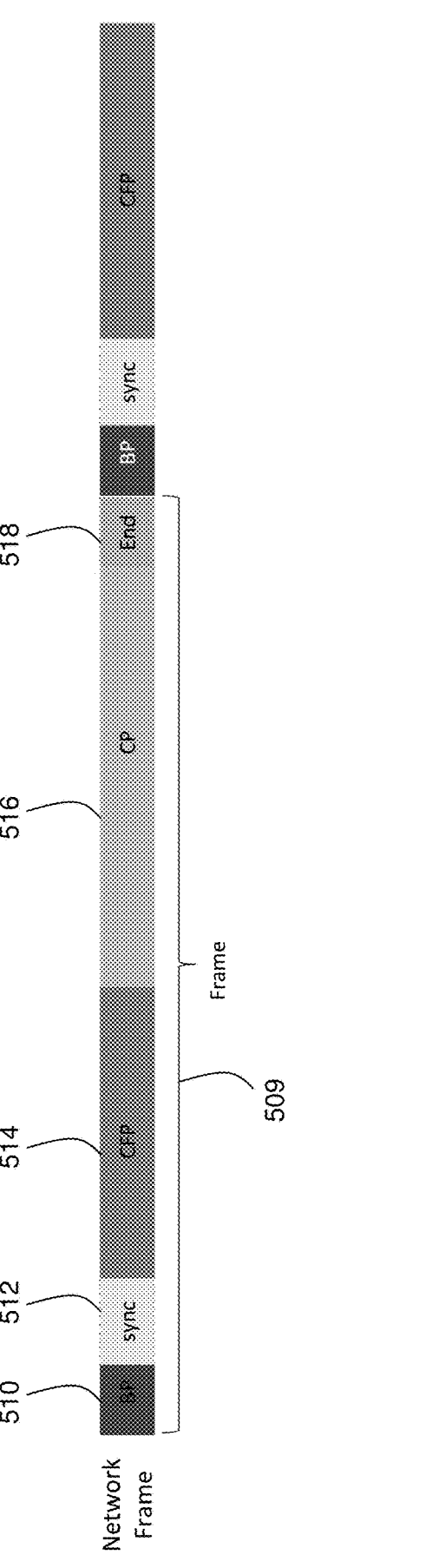
FIG. 11 is a block diagram illustrating an exemplary, non-limiting embodiment of a network frame in accordance with various aspects described herein.

FIG. 11 is a block diagram illustrating an exemplary, non-limiting embodiment of a network frame 509 that can be utilized by the network 501 in accordance with various aspects described herein. The network frame 509 can include a beacon signal 510, a sync period 512, a contention-free period (CFP) 514, a contention period (CP) 516, and an end period 518. The beacon signal 510 is generated by anchors 204 to provide anchors 204 and mobile tags 201 a means for synchronization. The CFP 514 portion of the frame 509 supports downlink TDOA (DL-TDOA) ranging packets, which in turn also supports the anchor pair scheduling depicted in FIG. 9. In the present context, the term "downlink" means communications from anchor to mobile tag, while the term "uplink" means communications from mobile tag to anchor. Transmissions during CFP 514 are scheduled to avoid simultaneous transmissions that lead to wireless signal interference. The CP 516 portion of the frame 509 supports uplink TDOA (UL-TDOA), TW-TOA ranging packets and additional data packets/control signaling packets and can be subject to simultaneous transmissions that in turn may interfere with each other.

The sync period 512 (which can be optional) provides a short buffer period for anchors 204 to synchronize the start of the CFP 514 to each other. The end period 518 (which can be optional) provides a short buffer period for a next frame 509 preparation or can serve as guard interval for ACK message transmissions. The network frame 509 is periodic as shown by the next repetitive sequence of fields in a subsequent network frame. Various other scheduling and timing, including use of particular frame structures can be used with the exemplary embodiments of the subject disclosure as described in U.S. Pat. No. 10,779,118 filed Jan. 11, 2019 to Duan et al., the disclosure of which is hereby incorporated by reference herein in its entirety.

Figure 12:
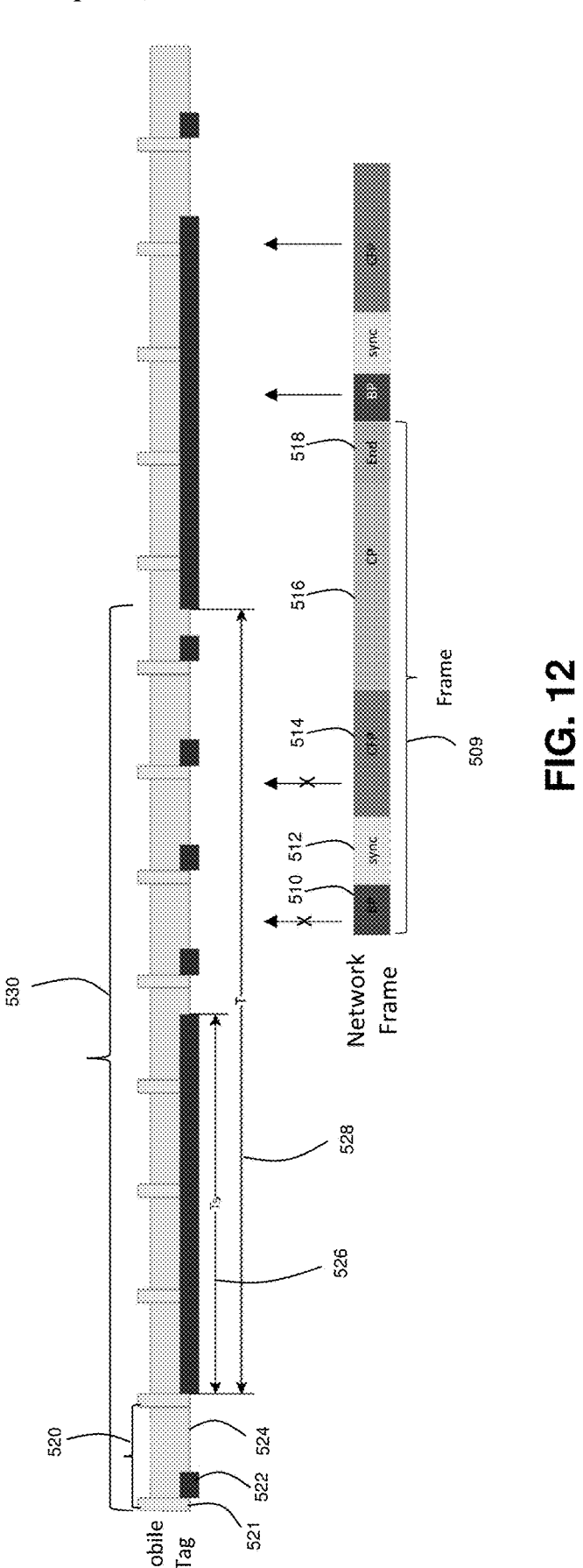
FIG. 12 is a block diagram illustrating an exemplary, non-limiting embodiment of a peer-to-peer frame configured for monitoring a presence of a network frame in accordance with various aspects described herein.

FIG. 12 is a block diagram illustrating an exemplary, non-limiting embodiment of a peer-to-peer frame configured for monitoring a presence of a network frame 509 in accordance with various aspects described herein. The peer-to-peer frame is referred to herein as a peer-to-peer super-frame 530. The peer-to-peer super-frame 530 can include a peer-to-peer sub-frame 520 and a network sub-frame 528. The peer-to-peer sub-frame 520 enables a mobile tag 201 located in the open space 503 of FIG. 10 to perform peer-to-peer range measurements as will be describe in FIGS. 14A-14D below. The peer-to-peer sub-frame 520 can include a peer-to-peer beacon signal 521, a ranging period 522, and listening period 524.

The peer-to-peer beacon signal 521 can be a Bluetooth (or ultra-wideband) signal that a mobile tag 201 broadcasts to other mobile tags 201 to initiate a ranging process to determine the relative location of the mobile tag 201 to other mobile tags 201 in its vicinity. The peer-to-peer beacon signal 521 can be an announcement message and/or synchronization signal to enable other mobile tags 201 to properly initiate a ranging process. During the ranging period 522, the mobile tag 201 can be configured to perform ranging measurements using ultra-wideband signals or other techniques (e.g., RF signal strength indicator (RSSI)). During the listening period 524, the mobile tag 201 can be configured to monitor response messages from other mobile tags 201 in its communication range using a Bluetooth (or ultra-wideband) receiver. The peer-to-peer sub-frame 520 is periodic as shown in FIG. 12.

To detect the presence of the network 501 with anchors 204, the mobile tag 201 can be configured to monitor during the network sub-frame 528 for a beacon signal 510 generated by one or more anchors 204 in the network 501. During the network sub-frame 528, the mobile tag 201 can be configured to turn on the ultra-wideband receiver to monitor a beacon signal 510 generated by one or more anchor 204 using an ultra-wideband transmitter. Generally, the ultra-wideband receiver of the mobile tag 201 draws more current than a Bluetooth narrowband receiver. To extend battery life of the mobile tag 201, the mobile tag 201 can be configured to maintain the ultra-wideband receiver on for a period 526 (depicted as Ts), which is less than the period (depicted as T) of the network sub-frame 528. The period 526 (Ts) can be chosen sufficiently large to enable the mobile tag 201 to detect a beacon signal of at least one network frame 509.

In the illustration of FIG. 12, a first instance of the beacon signal 510 is not detected because it occurs outside the period 526 (Ts) in which the ultra-wideband receiver of the mobile tag 201 is enabled to monitor for beacon signals. However, during a second instance of a super-frame 530, a beacon signal from a second instance of a network frame 509 is detected during the period 526 (Ts) of the network-subframe 528 of the mobile tag 201. Upon detecting the beacon signal 510, the mobile tag 201 can be configured to extend the period 526 (Ts) to enable the mobile tag 201 to receive multiple instances of a beacon signal 510 which enables the mobile tag 201 to synchronize its clock to the network frame 509. Upon achieving synchronization, the mobile tag 201 can be configured to determine whether to transition from a peer-to-peer communications mode (as depicted in FIG. 12) to a network communications mode (as depicted in FIG. 11) is warranted.

In an embodiment, the mobile tag 201 can be configured to store a coverage map of the network 501. The coverage map can indicate areas in the network 501 where access to anchors 204 is available and not available. Alternatively or in combination with the foregoing embodiment, the mobile tag 201 can be configured to receive a message including a coverage map (or portion of the coverage map that represents a vicinity where the mobile tag 201 is located) from at least one anchor 204 after the mobile tag 201 has synchronized to the network frame 509. The mobile tag 201 can also be configured to track a history of its movements from the time it left the network 501 to an open space 503 not inside the wireless coverage area of the network 501. The mobile tag 201 can performing this type of tracking by utilizing an accelerometer, gyroscope, and/or magnetometer (compass) to determine a history of positions from inside the network 501 to an open space 503 and back to the network 501. By tracking a history of positions, the mobile tag 201 can determine where it is in the coverage map of the network 501 and thereby determine whether it is in a communication range of one or more anchors 204 in the network 501. Alternatively, the mobile tag 201 can be configured to try to communicate with one or more anchors 204 and determine from ranging measurements whether it is located in the network 501. In yet another embodiment, the mobile tag 201 may receive messages from anchors 204 during CFP period and based on the number of messages and quality of messages received during CFP period determine if it is in the communication coverage of anchors 204 in the network 501.

Figure 13:
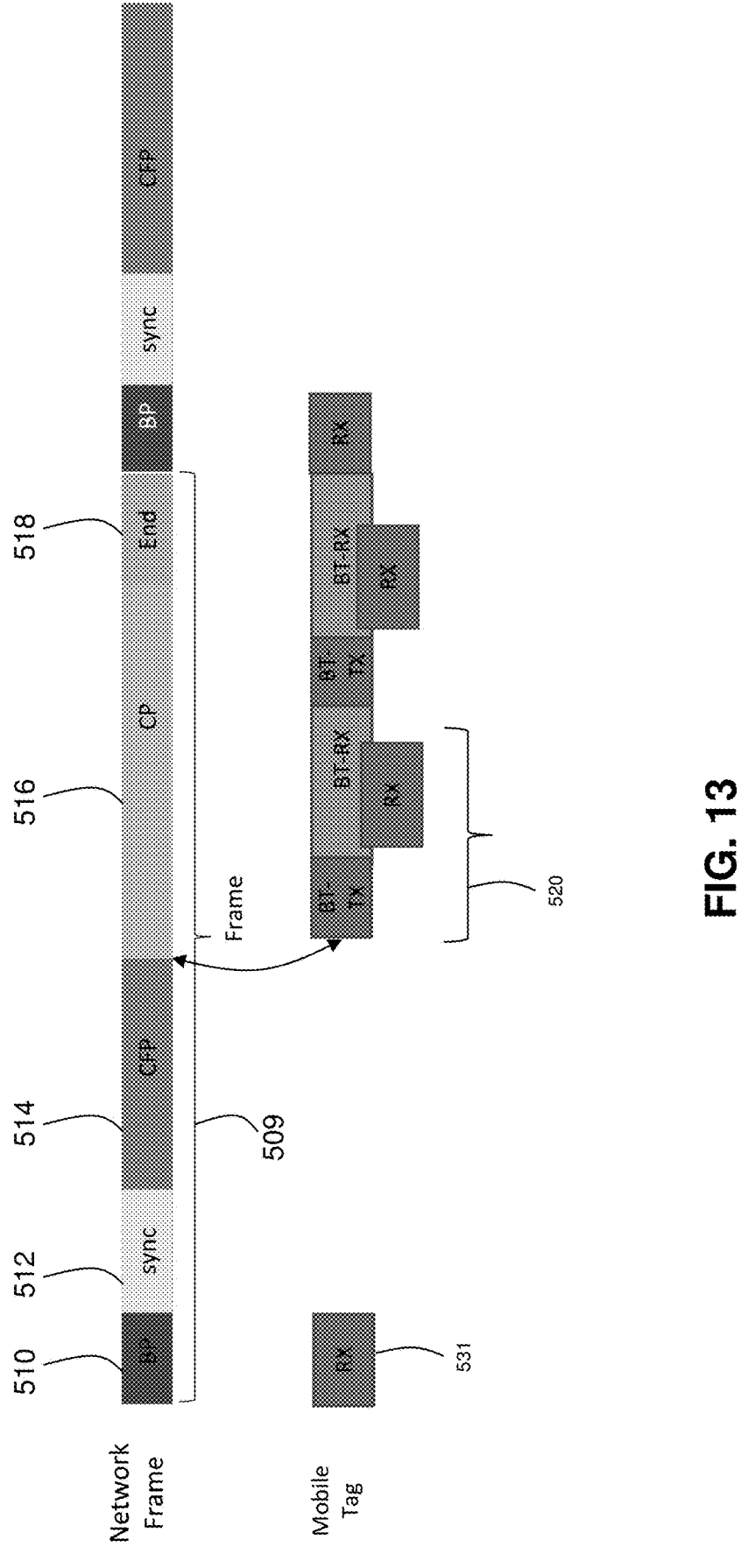
FIG. 13 is a block diagram illustrating an exemplary, non-limiting embodiment of a mobile tag configured to utilize peer-to-peer communications in a manner that avoids interfering with portions of a network frame in accordance with various aspects described herein.

If the mobile tag 201 cannot reliably communicate with anchors 204 in the network 501, or cannot make an accurate measurement of its location relative to one or more anchors, and/or it determines from a coverage map and position history that it is an area of the network 501 where anchors 204 are not accessible, then the mobile tag 201 can be configured to adjust peer-to-peer mobile tag communications to occur in a position in a network frame 509, which minimizes the chances of causing wireless signal interference with anchors 204 or other mobile tags 201 engaged in a network communications mode as depicted in FIG. 13.

FIG. 13 is a block diagram illustrating an exemplary, non-limiting embodiment of a mobile tag 201 configured to utilize peer-to-peer communications in a manner that avoids interfering with portions of a network frame 509 in accordance with various aspects described herein. To minimize RF interference with anchors 204 and/or other mobile tags 201 operating in a network communications mode, a mobile tag 201 that has insufficient coverage in the network 501 (e.g., cannot access one or more anchors 204) can be configured to maintain peer-to-peer communications in the CP 516 portion (i.e., contention period) of the network frame 509 and maintain synchronicity with the network frame 509 by monitoring the beacon signal 510 via a short listening period 531. Since the CP 516 portion allows for contentions (i.e., RF interference due to simultaneous RF transmissions), contentions caused by the mobile tag 201 performing peer-to-peer communications can be tolerated and will not cause issues with RF transmissions by anchors 204 utilizing the CFP portion 514 (contention-free period) of the network frame 509. The mobile tag 201 can perform this adjustment after it has synchronized its clock to the network frame 509 utilizing the beacon signal 510 as a reference signal. Once the mobile tag 201 has adapted peer-to-peer communications in the CP portion 516 of the network frame 509, the mobile tag 201 can cease to use timing associated with the peer-to-peer super-frame 530 depicted in FIG. 12, and instead resort to utilizing only the sub-frame 520 within the CP portion 516 of the network frame 509.

If, on the other hand, the mobile tag 201 determines that it is in the communication range of a sufficient number of anchors 204 in the network 501 to adequately determine its location in the network 501, then the mobile tag 201 can be configured to fully transition to a network communications mode by ceasing to utilize peer-to-peer communications altogether as depicted in FIG. 12 and rely exclusively on communications with anchors 204 utilizing the network frame 509 of FIG. 11.

Figure 14A:
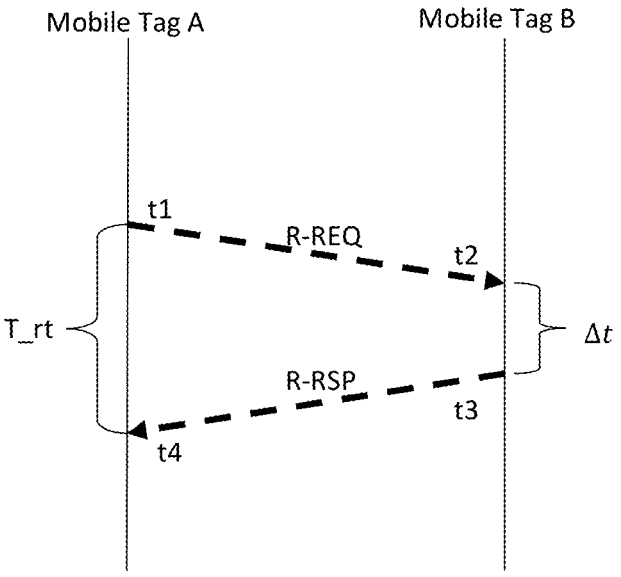

FIGS. 14A-14D describe various embodiments for peer-to-peer communications that can be applied to the afore-mentioned embodiments described above. FIG. 14A depicts a two-way time of arrival (TW-TOA) peer-to-peer process for determining distances between mobile tags (mobile tag A and mobile tag B). The process can begin at mobile tag A which transmits a range request (R-REQ) signal to mobile tag B at time ti. Mobile tag B receives the R-REQ signal at time $t_2$. Mobile tag B processes the R-REQ signal for a period of At, and responsive thereto transmits a range response (R-RSP) signal at $t_3$. Mobile tag A receives the R-RSP signal at $t_4$. Mobile tag A can determine a roundtrip distance based on the formula $d_{r\text{-}trip}=d_{AB}+d_{BA}$, where $d_{r\text{-}trip}$ is the roundtrip distance, which is the sum of $d_{AB}$, the distance from mobile tag A to mobile tag B, and $d_{BA}$, the distance from mobile tag B to mobile tag A. The distance from mobile tag A to mobile tag B can be determined by $d_{AB}=c(t_2-t_1)$, where c is the speed of light. Similarly, the distance from mobile tag B to mobile tag A can be determined by $d_{BA}=c(t_4-t_3)$. Substituting the above equations, the roundtrip distance can be rewritten as $d_{r\text{-}trip}=c(t_4-t_3+t_2-t_1)$.

The time to process the R-REQ signal and to transmit the R-RSP signal via mobile tag B can be represented as $\Delta t=t_3-t_2$. Mobile tag B can be configured to transmit the value of $\Delta t$ in the R-RSP signal for use by mobile tag A in calculating $d_{r\text{-}trip}$. Substituting $\Delta t$ in $d_{r\text{-}trip}$ results in the formula: $d_{r\text{-}trip}=c(t_4-t_1-\Delta t)$. Since the values of $t_4$, $t_1$, and $\Delta t$ are known to mobile tag A, mobile tag A can readily calculate $d_{r\text{-}trip}$. Mobile tag A can also calculate the distance from mobile tag A to mobile tag B based on the formula: $d_{AB}=d_{r\text{-}trip}/2$. It will be appreciated that mobile tag A can also be configured to know a priori the fixed value of $\Delta t$. In yet another embodiment, the processing time to receive the R-REQ signal and respond with the transmission of the R-RSP signal can be a fixed processing time interval known and used by all mobile tags performing TW-TOA analysis. In the foregoing embodiments, the value of $\Delta t$ would no longer need to be transmitted in the R-RSP signal. It will be further appreciated that the R-REQ and the R-RSP signals can be transmitted using ultra-wideband signaling technol-ogy to increase the accuracy of the $d_{r\text{-}trip}$ calculations or derivatives thereof. Accordingly, the TW-TOA illustrated in FIG. 14A can be used by either mobile tag A or mobile tag B to calculate a relative distance between each other. This process can be utilized in the embodiments that follow below.

Figure 14B:
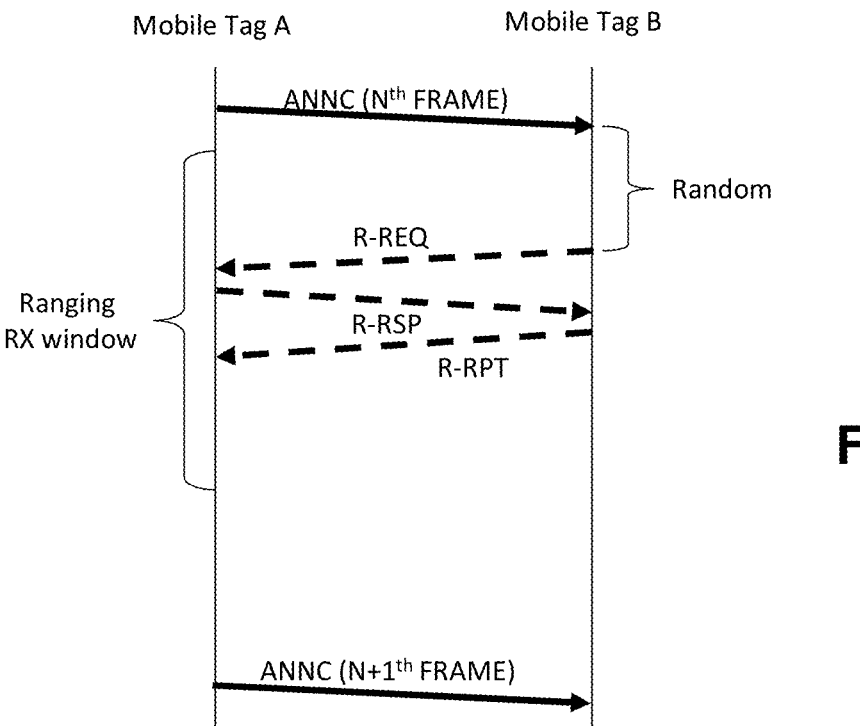

FIG. 14B depicts an exemplary, non-limiting embodiment of a peer-to-peer process for determining location data between mobile tags in accordance with various aspects described herein. In FIG. 14B, Mobile tag A can begin by transmitting an announcement wireless signal (ANNC) uti-lizing a low power narrow band transmitter (such as a Bluetooth transmitter). Upon receiving at mobile tag B the announcement signal utilizing a narrow band receiver (e.g., Bluetooth receiver), mobile tag B can in response select a random time to transmit via a wideband transmitter a range request (R-REQ) signal utilizing a wideband signaling tech-nology (e.g., ultra-wideband signal at high frequencies such as 500 MHz). Mobile tag A can be configured to turn on a wideband receiver (e.g., for receiving ultra-wideband sig-nals) during a ranging RX window as shown in order to receive the R-REQ signal from mobile tag B and/or other mobile tags in a vicinity of mobile tag A that are responding to the announcement signal generated by mobile tag A.

Upon receiving the R-REQ signal, mobile tag A can be configured to enable a wideband transmitter (e.g., for trans-mitting ultra-wideband signals) to transmit a range response (R-RSP) signal. Mobile tag B can receive the R-RSP signal with a wideband receiver (e.g., for receiving ultra-wideband signals). Upon receiving the R-RSP signal, mobile tag B can determine the round-trip time between the R-REQ signal and the R-RSP signal and thereby determine a distance between mobile tag B and mobile tag A as described in relation to FIG. 14A. The R-RSP signal can include a processing time by mobile tag A to receive R-REQ and thereafter transmit R-RSP ($\Delta t$), or such time can be known to mobile tag B as previously described.

In addition to measuring a relative distance between mobile tags, mobile tag B (or mobile tag A) can be config-ured with multiple antennas to calculate an angle of arrival of the R-RSP signal based on a phase difference between the antennas. Such angle of arrival can be used to determine an angular orientation between mobile tag B and mobile tag A. By combining the angular orientation with a determination of the distance between mobile tags A and B, mobile tag B can also determine a location and angular orientation of mobile tag A relative to the location of mobile tag B.

Additionally, the announcement signal can be submitted periodically or asynchronously to prompt multiple measure-ments by mobile tag B (and other mobile tags in a vicinity for receiving the announcement signal) utilizing the process described in FIG. 14B. Distance and angular orientation can be used by mobile tag B (and other mobile tags) to also determine a trajectory of mobile tag A relative to mobile tag B (and vice-versa). Mobile tag B can also be configured to report to mobile tag A location information such as the measured distance, angular orientation, position, and/or tra-jectory of mobile tag A and/or B via a range report (R-RPT) signal. The R-RPT signal can be a narrow band signal (e.g., Bluetooth) or wideband signal (e.g., ultra-wideband). The trajectory data can be used to predict collisions between mobile tags A and B enabling each mobile tag to take mitigation action such as asserting an alarm at mobile tag B and/or mobile tag A.

Additionally, warning conditions can be provisioned at both mobile tags A and B to determine conformance with a required separation between mobile tags A and B. The warning conditions can be separation thresholds and/or trajectory thresholds. If the warning condition is not satis-fied, mobile tags A and/or B can be configured to assert alarms. The alarms can be audible alarms, illuminating alarms (e.g., flashing colored light) or a combination thereof. Additionally, the embodiments depicted by FIG. 14B can be reversed in which mobile tag B is the one originating the announcement signal and mobile tag A calculates its location and/or orientation relative to mobile tag B as described above, and shares the same with mobile tag B.

Figure 14C:
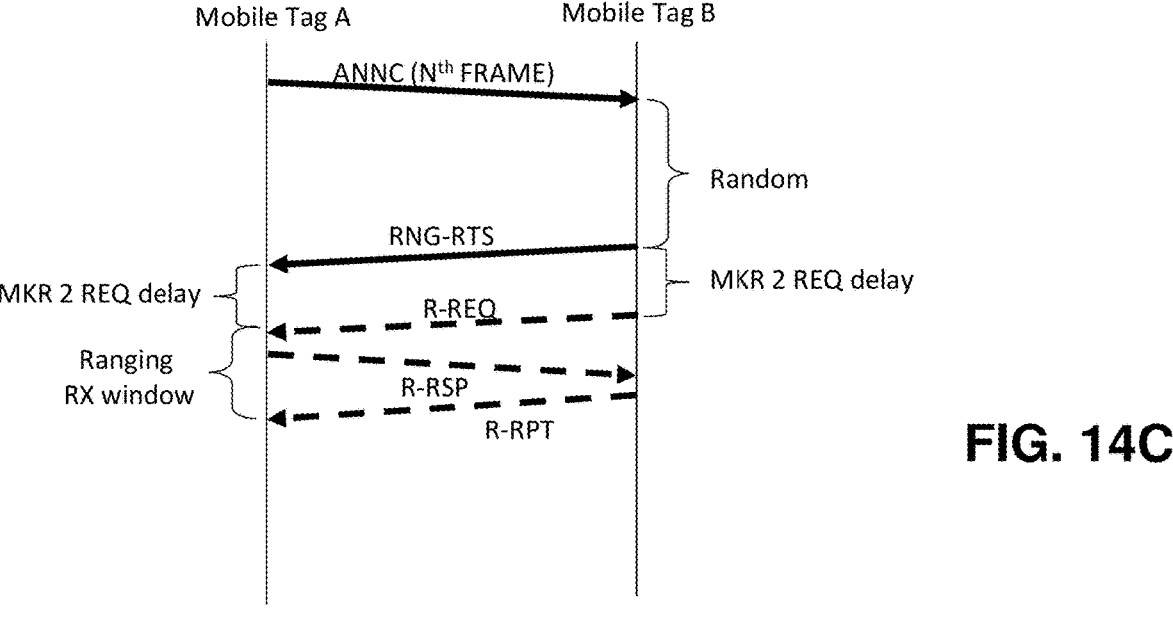

FIG. 14C depicts an adaptation to the embodiments of FIG. 14B. In particular, mobile tag B can be configured to transmit in response to the announcement signal a range ready-to-send (RNG-RTS) signal using narrow band signal-ing technology such as Bluetooth. The RNG-RTS signal can include timing information that indicates when mobile tag B will transmit the R-REQ signal. By knowing this timing, mobile tag A can substantially reduce the ranging RX window (which saves battery life of mobile tag A) by knowing the arrival time of the R-REQ signal and a predetermined time for receiving the R-RPT signal. If an R-RPT signal is not expected, mobile tag A can shorten the ranging RX window even further and thereby further improve battery life. The location and/or orientation measurements can be performed by mobile tag B as previously described in relation to FIG. 14B.

Figure 14D:
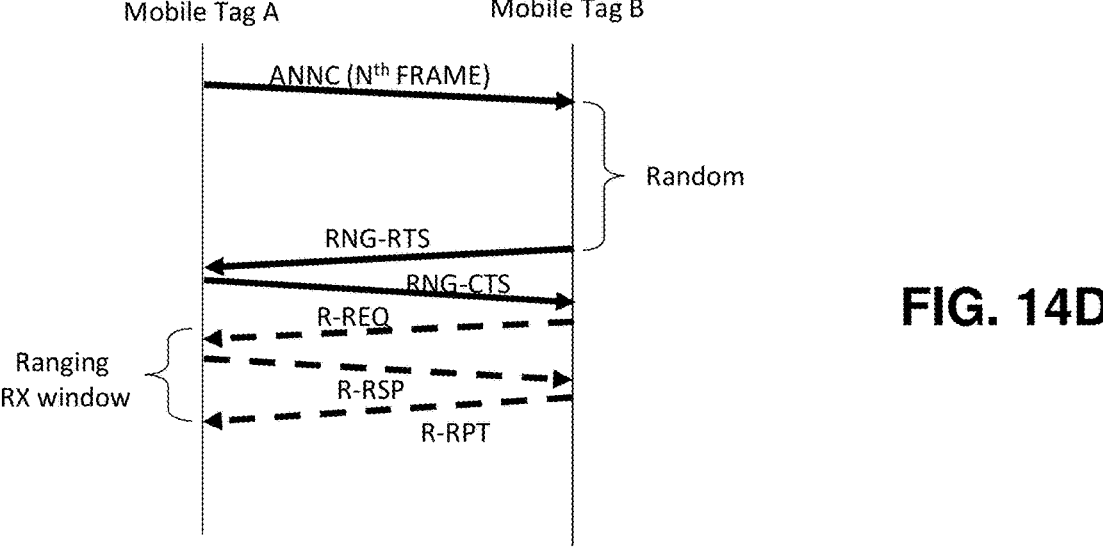

FIG. 14D depicts an adaptation to the embodiments of FIGS. 14B-14C. In this illustration, mobile tag A can be configured to transmit in response to the RNG-RTS signal a ranging clear-to-send (RNG-CTS) signal using narrow band signaling technology such as Bluetooth. The RNG- CTS signal can include timing information that indicates when mobile tag B should transmit the R-REQ signal. In this embodiment, mobile tag A can control the initial transmission time of the R-REQ signal thereby enabling mobile tag A to limit the size of the ranging RX window, reduce current draw from the ultra-wideband transceiver and thereby improve battery life of mobile tag A. The previously described embodiments of FIGS. 14B-14C are applicable to FIG. 14D for performing location and/or orientation measurements by mobile tag B and sharing such information with mobile tag A via the R-RPT signal.

Figure 14E:
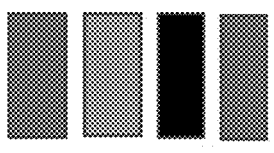

FIG. 14E temporally depicts illustrations of peer-to-peer communications between mobile tags based on transmission and reception intervals for achieving the embodiments described in relation to FIGS. 14A-14D. Each mobile tag is equipped with two radios (radio-1 540 and radio-2 542). Radio-1 540 is configured to transmit and receive Bluetooth signals, while radio-2 542 is configured to transmit and receive ultra-wideband signals. Since Bluetooth signals are narrow band signals, Bluetooth operations expend less power than ultra-wideband signals. Accordingly, utilizing a Bluetooth radio, when possible, can extend battery life of the mobile tags. FIG. 14E also depicts components of the peer-to-peer super-frame 530 previously describe in FIG. 12 for performing peer-to-peer range measurements 544. As described in FIG. 12, peer-to-peer sub-frames 520 can be combined with the network sub-frame 528 to form a peer-to-peer super-frame 530, which enables a mobile tag 201 to perform peer-to-peer range measurements with other mobile tags 201 while monitoring for a presence of network anchors (not shown in FIG. 14E) that can trigger a process for transitioning a network communications mode as will be described further in method 600 of FIG. 17.

Figure 15:
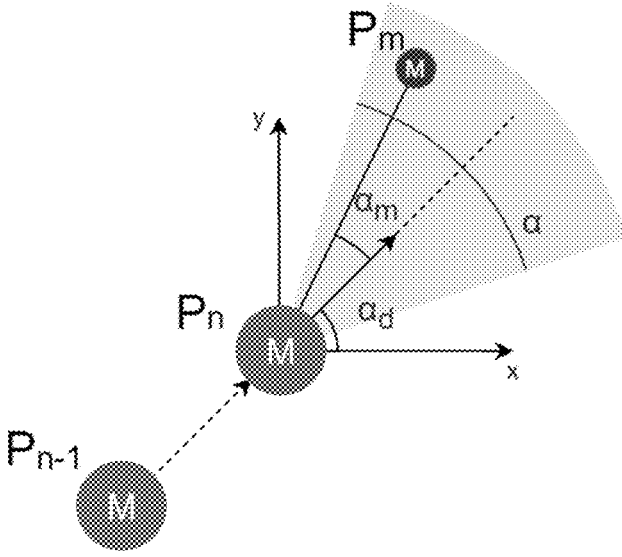
FIG. 15 is a block diagram illustrating an exemplary, non-limiting embodiment of capabilities of a mobile tag to determine its location in a network of anchors providing location services in accordance with various aspects described herein.

FIG. 15 is a block diagram illustrating an exemplary, non-limiting embodiment of capabilities of a mobile tag 201 to determine its location in a network of anchors providing location services in accordance with various aspects described herein. In the illustration of FIG. 15, a mobile tag 201 located in the network 501 of anchors 204 and operating in a network communications mode (i.e., exclusively performing ranging measurements with anchors 204) can determine its relative position to another mobile tag 201 and based on a history of positions ($P_{n-1}$ to $P_n$) its angular trajectory relative to the other mobile tag 201. Such angular trajectory can be used to assert alarms to avoid collisions, enforce social distancing, and/or other policies set by an administrator of the mobile tags 201 and/or network 501 of anchors 204.

Figure 16:
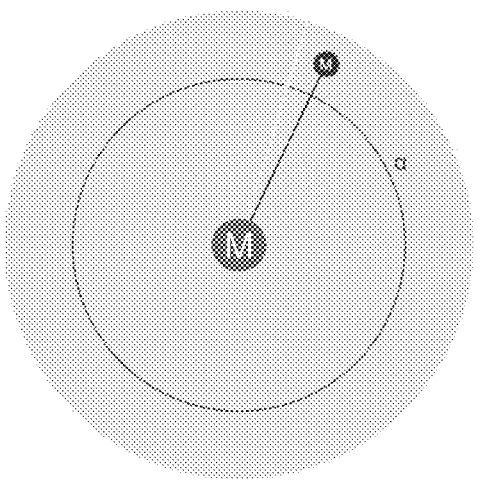
FIG. 16 is a block diagram illustrating an exemplary, non-limiting embodiment of capabilities of a mobile tag to determine its location utilizing peer-to-peer communications with other mobile tags in accordance with various aspects described herein.

FIG. 16 is a block diagram illustrating an exemplary, non-limiting embodiment of capabilities of a mobile tag 201 to determine its location utilizing peer-to-peer communications with other mobile tags 201 in accordance with various aspects described herein. In the illustration of FIG. 16, the mobile tag 201 is limited to determining its relative location to another mobile tag 201 without trajectory information or angular orientation. In an alternative embodiment, the mobile tag 201 can perform the functions described in FIG. 15 with instrumentation such as one or more accelerometers, one or more gyroscopes, and/or a magnetometer. With such instrumentation, a mobile tag 201 can utilize as a reference point a last known location of the mobile tag 201 while in the network 501 of anchors 204 and determine thereafter utilizing the instrumentation a history of positions ($P_{n-1}$ to $P_n$) and its angular trajectory relative to another mobile tag 201 utilizing similar instrumentation.

Figure 17:
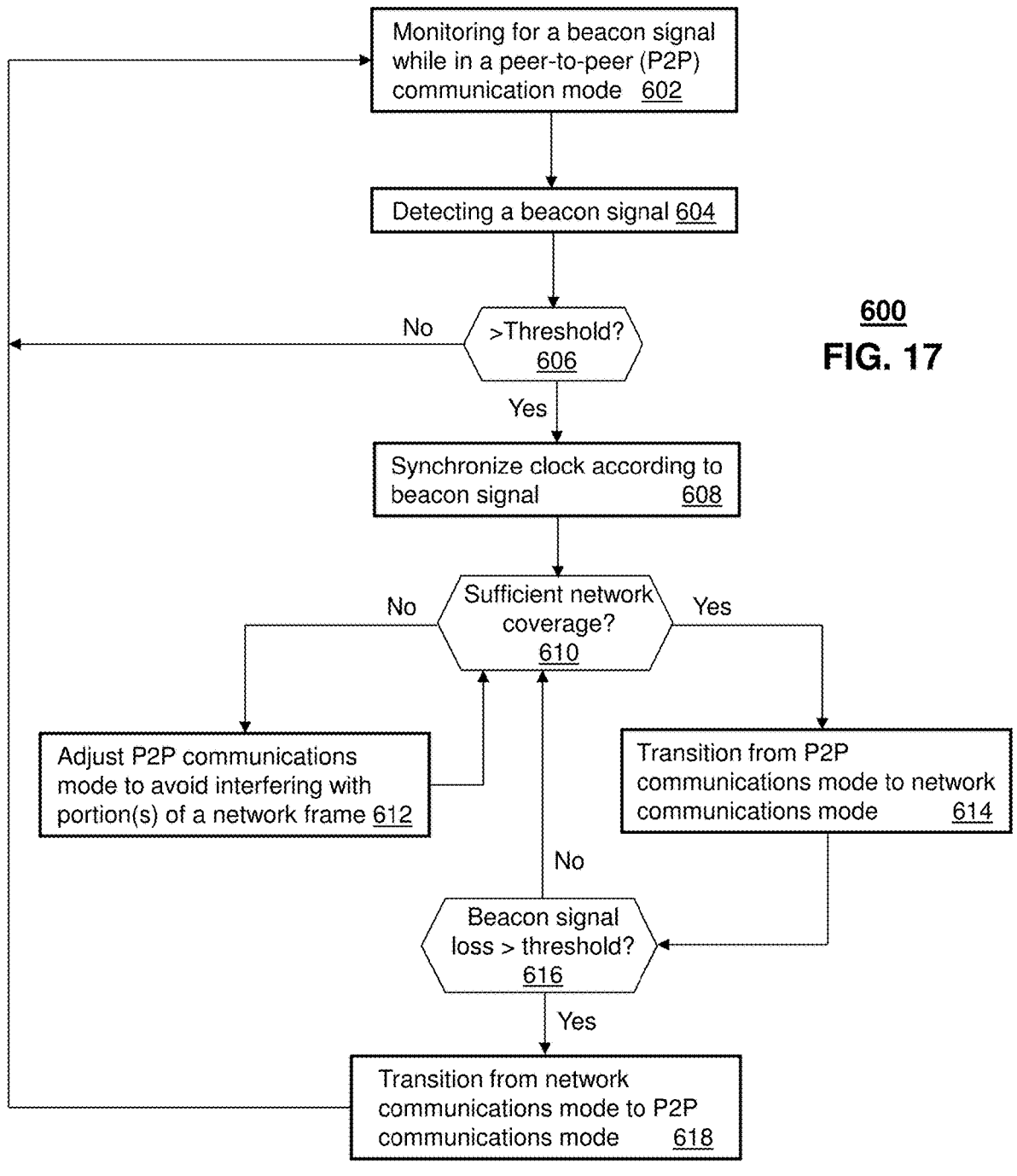
FIG. 17 depicts an illustrative embodiment of a method for transitioning between modes of communications; particularly, peer-to-peer communications mode and network communications mode in accordance with various aspects described herein.

FIG. 17 depicts an illustrative embodiment of a method 600 for transitioning between modes of communications; particularly, peer-to-peer communications mode and network communications mode in accordance with various aspects described herein. Method 600 can begin with step 602 where a mobile tag can be configured to monitor a beacon signal while in a peer-to-peer communications mode utilizing, for example, the peer-to-peer super-frame 530 (and corresponding network sub-frame 528) shown in FIG. 12. As noted earlier, the peer-to-peer communication mode may be invoked when the mobile tag 201 transitions out of the coverage area of the network 501 of anchors 204 into an open space 503 or when the mobile tag 201 is located in the network 501 in an area that lacks coverage from anchors 204, which causes the mobile tag 201 to resort to the embodiment described in relation to FIG. 13.

Upon detecting a beacon signal at step 604 while in a peer-to-peer communications mode, the mobile tag 201 can proceed to step 606 where it determines if a threshold of instances of a beacon signal has been satisfied (e.g., a threshold set to greater than 2 consecutive beacon signals). If the threshold is not satisfied, the mobile tag 201 can be configured to return to step 602 and continue the monitoring process. If the threshold is satisfied, the mobile tag 201 can be configured at step 608 to synchronize its clock to the network frame 509 of FIG. 11 utilizing one or more instances of the beacon signal. In an embodiment, synchronization can take place during one or more instances of the synchronization period 512. Once synchronized, the mobile tag 201 can proceed to step 610 to determine if there is sufficient coverage in the network 201 to transition to a network communications mode (i.e., performing ranging measurements exclusively with the assistance of one or more anchors 204).

In one embodiment, the coverage determination of step 610 can be performed by the mobile tag 201 by comparing its location to a look-up table (or database) of sub-coverage areas in the network 501 (not shown in FIG. 10). If the mobile tag 201 has instrumentation to reasonably determine where it is located within the network 501, such location information may be sufficient for the mobile tag 201 to determine from a look-up table (or database) whether it is in an area of the network 501 where it has sufficient access to anchors 204 to safely transition to a network communications mode, or whether it should transition to an adjusted peer-to-peer communications mode as depicted FIG. 13. The look-up table (or database) can be provided by one or more anchors at a previous time when the mobile tag 201 was located in the network 501 and operating in a network communications mode or from another source (e.g., mobile tag 201 paired with a communication device such as a smartphone that can communication with a server of the network 501 via a cellular network or other communication means). In another embodiment, the mobile tag 201 can be configured to receive one or more messages from one or more anchors 204 transmitting its location in the network 501, which the mobile tag 201 can then compare to the look-up table (or database) to determine if it is in a location that supports a safe transition to a network communications mode. In another embodiment, the mobile tag 201 may receive one or more messages from one or more anchors 204 in the network 501 during the CFP period, which the mobile tag 201 can use to determine if it is able to transition to a network communications mode based on the number of messages and/or quality of the received messages from anchors 204 in the network 501 during the CFP period. For example, the quality of messages can be determined from a number of consecutive received messages exceeding a signal strength threshold. Such measurements can enable a mobile tag 201 to determine if there is sufficient (or insufficient) coverage in the network 501 of anchors 204 to transition from peer-to-peer communications to network communications or remain in peer-to-peer communications but operate in the mode shown in FIG. 13.

If the mobile tag 201 detects at step 610 that there is insufficient coverage in the network 501 relative to its current location to transition to a network communications mode, then the mobile tag 201 can proceed to step 612 where the mobile tag 201 can transition from a peer-to-peer communications mode as depicted in FIG. 12 to an adjusted peer-to-peer communications mode as shown in FIG. 13 (or maintain this adjusted communications mode if the mobile tag 201 had already previously implemented step 612). Alternatively, if the mobile tag 201 detects at step 610 that there is sufficient coverage to transition to a network communications mode, the mobile tag 201 can transition from a peer-to-peer communications mode as depicted in FIG. 12 to a network communications mode depicted by FIG. 11 where it performs ranging measurements exclusively with the assistance of anchors 204 of the network 501.

Once the transition from a peer-to-peer communications mode to a network communications mode occurs at step 614, the mobile tag 201 can be configured to monitor a lack of a presence of a beacon signal generated by the anchors 204 of the network 501. If the number of instances where the mobile tag 201 detects a lack of a beacon signal satisfies a threshold (greater than 2 consecutive lost beacon signals), the mobile tag 201 can transition to step 618 where it transitions from a network communications mode as depicted in FIG. 11 to a peer-to-peer communications mode as depicted by FIG. 12, and begins to monitor at step 602 for a presence of a beacon signal to transition back to the network communications mode once the instances of beacon signals satisfies the threshold of step 606 as previously described. If no lost beacon signals are detected at step 616, the mobile tag 201 can proceed to step 610 to determine if there's sufficient coverage to remain in the network communications mode at step 614. If the mobile tag 201 determines at step 616 that there is insufficient coverage, then the mobile tag 201 can proceed to step 612 and perform peer-to-peer communication as previously described above.

While for purposes of simplicity of explanation, the respective processes are shown and described as a series of blocks in FIG. 17, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 18:
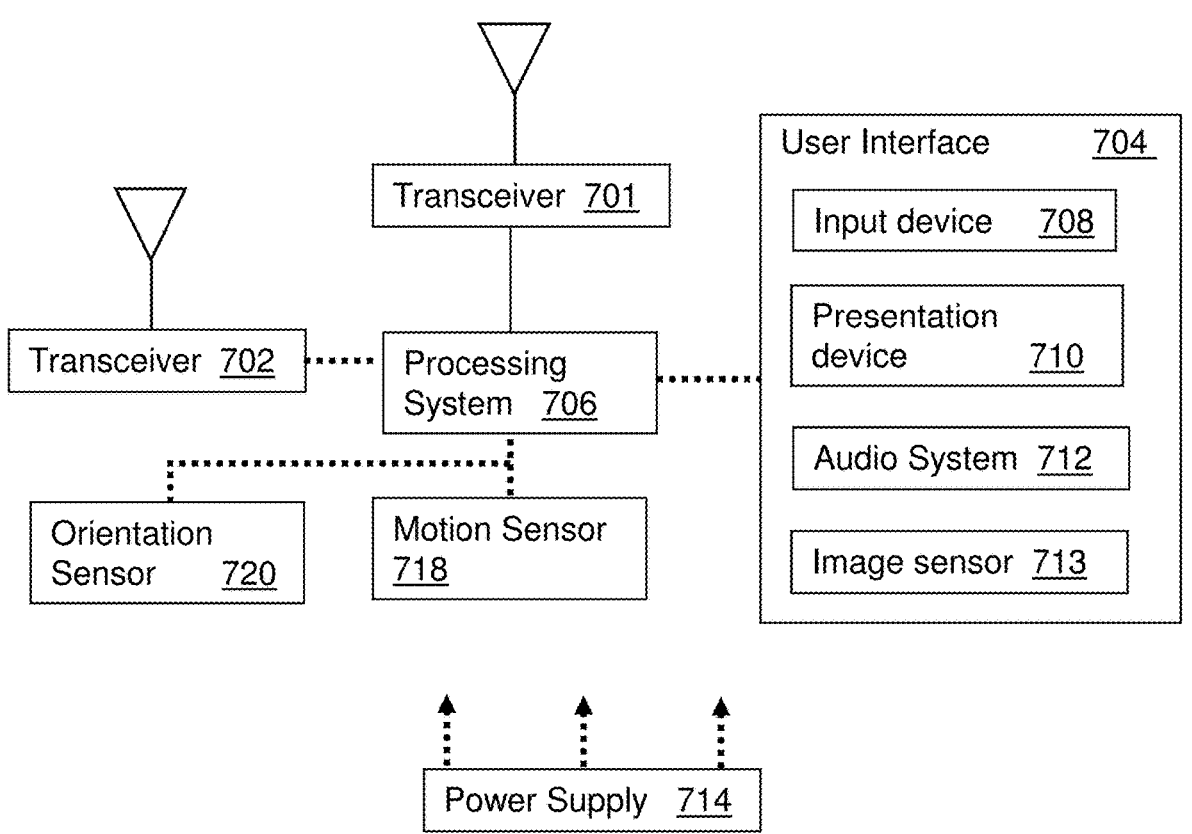
FIG. 18 is a block diagram of an example, non-limiting embodiments of a communication device in accordance with various aspects described herein.

FIG. 18 is a block diagram of an example, non-limiting embodiments of a communication device 700 in accordance with various aspects described herein. Communication device 700 can serve in whole or in part as an illustrative embodiment of a mobile tag 101, 201 and an anchor 102, 104, 106, 108, 204 as depicted in FIGS. 1-7, and can be configured to perform in whole or in part portions of methods 300 and 600 of FIGS. 8 and 17.

In an embodiment, communication device 700 can comprise a first wireless transceivers 701, a user interface (UI) 704, a power supply 714, and a processing system 706 for managing operations of the communication device 700. In another embodiment, communication device 700 can further include a second wireless transceiver 702, a motion sensor 718, and an orientation sensor 720. The first wireless transceiver 701 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 702 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 702 can be utilized to conserve power and offload messaging between communication devices by utilizing narrow band signals such as Bluetooth®, ZigBee®, or WiFi, instead of ultra-wideband signals. One or both wireless transceivers 701, 702 can also be used for obtaining a strength indicator (RSSI). One or both wireless transceivers 701, 702 can also be equipped with multiple antennas and one or more phase detectors to determine angle of arrival of wireless signals and thereby an orientation of the communication device 700 (e.g., mobile tag 101) relative to another communication device 700 (e.g., anchor 204).

The UI 704 can include an input device 708 that provides at least one of one or more depressible buttons, a tactile keypad, a touch-sensitive keypad, or a navigation mechanism such as a roller ball, a joystick, or a navigation disk for manipulating operations of the communication device 700. The input device 708 can be an integral part of a housing assembly of the communication device 700 or an independent device operably coupled thereto by a tethered wireline interface (such as a USB cable) or a wireless interface supporting for example Bluetooth®. The UI 704 can further include a presentation device 710. The presentation device 710 can include a vibrator to generate haptic feedback, an LED (Light Emitting Diode) configurable by the processing system 706 to emit one or more colors, and/or a monochrome or color LCD (Liquid Crystal Display) or OLED (Organic LED) display configurable by the processing system to present alphanumeric characters, icons or other displayable objects.

The UI 704 can also include an audio system 712 that utilizes audio technology for conveying low volume audio (for proximity listening by a user) and/or high volume audio (for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images in a vicinity of the communication device 700. The camera can be used for performing facial recognition and user ID recognition that can be combined with embodiments of the subject disclosure.

The power supply 714 can utilize common power management technologies such as replaceable and rechargeable batteries, supply regulation technologies, and/or charging system technologies for supplying energy to the components of the communication device 700 to facilitate portable applications. Alternatively, or in combination, the charging system can utilize external power sources such as DC power supplied over a physical interface such as a USB port or other suitable tethering technologies.

The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (in degrees, minutes, or other suitable orientation metrics). In some embodiments, the orientation sensor 720 can replace a need for utilizing multiple antennas with the first and/or second wireless transceivers 701, 702 and a phase detector for performing angle of arrival measurements. In other embodiments, the function of the orientation sensor 720 can be combined with an angle of arrival measurement performed with multiple antennas with the first and/or second wireless transceivers 701, 702 and a phase detector.

The processing system 706 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 18 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings.

The communication device 700 as described herein can operate with more or less of the circuit components shown in FIG. 18. These variant embodiments can be used in one or more embodiments of the subject disclosure.

Figure 19:
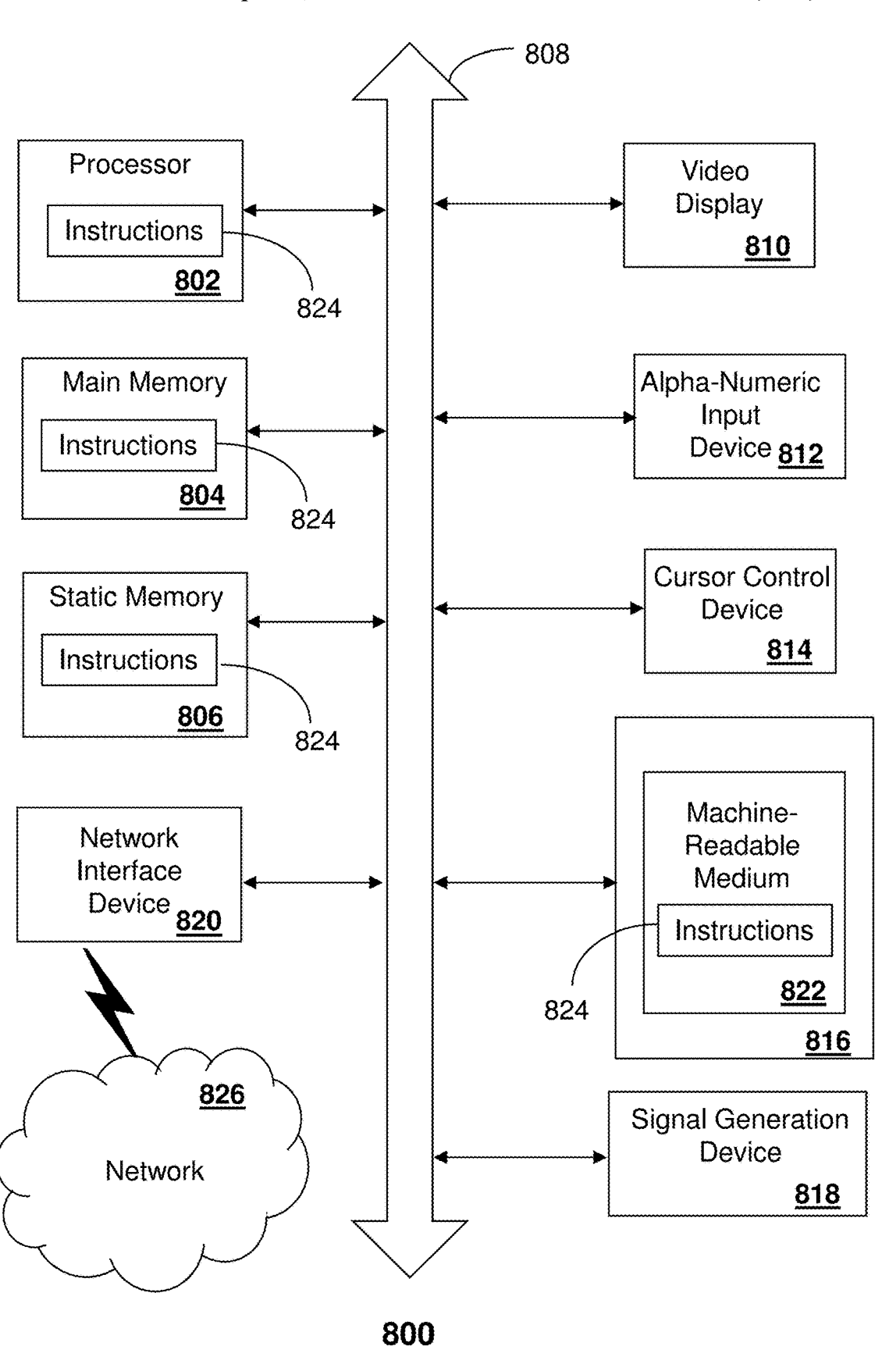
FIG. 19 is a block diagram of an example, non-limiting embodiments of a computing system in accordance with various aspects described herein.

FIG. 19 depicts an exemplary diagrammatic representation of a machine in the form of a computing system 800 within which a set of instructions, when executed, may cause the machine to perform any one or more of the methods described above. One or more instances of the machine can operate, for example, as the computing system referred to in methods 300 or 600 of FIGS. 8 and 17. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

One or more aspects of the subject disclosure include a device that utilizes a processing system including a processor and a memory that stores executable instructions that, when executed by the processing system, facilitate performance of operations. The operations can include monitoring a beacon signal generated by at least one anchor of a plurality of anchors located in a network, the network enabling the device and a plurality of other devices to determine their respective locations in a coverage area of the network, detecting a plurality of instances in which the beacon signal generated by the at least one anchor of the plurality of anchors is not sensed by the device, and responsive to the plurality of instances exceeding a first threshold, transitioning to peer-to-peer communications between the device and one or more devices of the plurality of other devices, wherein the peer-to-peer communications enables the device to determine its location relative to the one or more devices.

One or more aspects of the subject disclosure include a machine-readable medium comprising executable instructions that, when executed by a processing system including a processor, facilitate performance of operations. The operations can include performing peer-to-peer communication services to determine a location of the device relative to other devices, monitoring for a presence of a beacon signal during a finite period having a select periodicity, the beacon signal generated by at least one anchor of a plurality of anchors located in a network, the network enabling the device and a plurality of other devices to determine their respective locations when located in a coverage area of the network, detecting the presence of the beacon signal generated by the at least one anchor of the network, extending the finite period to synchronize a clock of the device to the beacon signal generated by the at least one anchor of the network, and responsive to the device being synchronized to beacon signal, determining whether to transition from peer-to-peer communications to communications with the at least one anchor of the plurality of anchors located in the network.

One or more aspects of the subject disclosure include a method for monitoring, by a processing system including a processor operating from a device, a synchronization signal generated by at least one anchor of a plurality of anchors located in a network, the network enabling the device and a plurality of other devices to determine their respective locations in a coverage area of the network; detecting, by the processing system, an inability to sense the synchronization signal generated by the at least one anchor of the plurality of anchors for a number of frames, each frame including an instance of the synchronization signal; and responsive to the detecting, configuring, by the processing system, the device to transition to peer-to-peer communications between the device and one or more devices of the plurality of other devices, wherein the peer-to-peer communications enables the device to determine its location relative to the one or more devices.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

FIGS. 20A-22B are block diagrams illustrating exemplary, non-limiting embodiments for communications utilized for location services for mobile tags, such as based on ranging block and round concepts. For example, a centralized control (such as scheduling) can be used to coordinate DL-TDOA transmissions in a large-scale network. As another example, a controller can be a server and a controlee can be anchor(s). As another example, an initiator can be a source anchor such as one sending a REQ message while a responder can be a destination anchor such as one sending an RSP message. The provisioning of the schedule by the server to the anchor(s) and/or mobile tag(s) can be via various techniques including utilizing wireless communications, and/or hardwire communications.

Figures 20A, 20B:
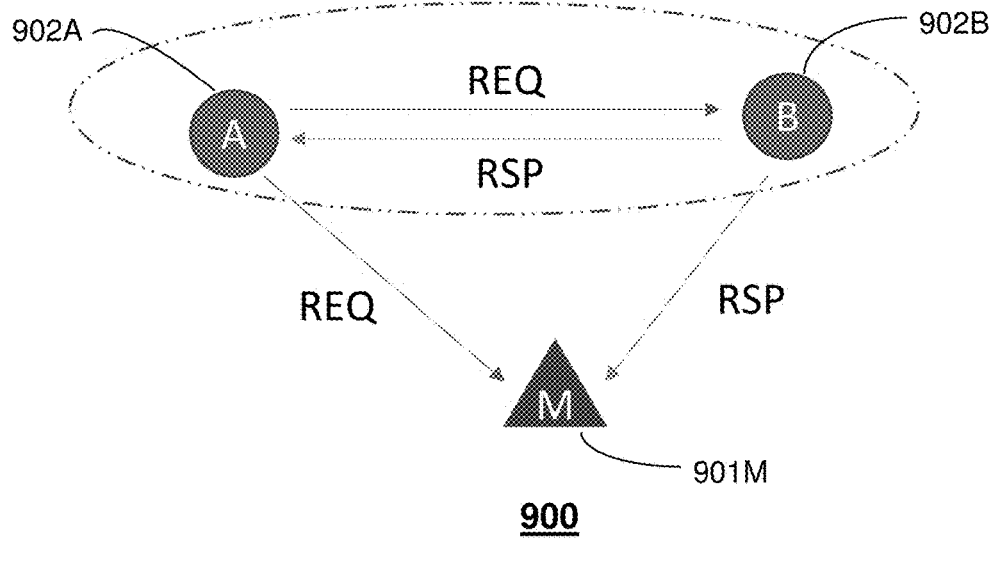
FIGS. 20A-20B are block diagrams illustrating an exemplary, non-limiting embodiment for determining location information of mobile tags using ranging block and ranging rounds in accordance with various aspects described herein.

As an example as illustrated in FIG. 20A, a portion of a system 900 can include any number of anchor pairs 902A, 902B (only two of which are shown), where anchor 902A sends a first message (REQ) and anchor 902B responds thereto with a second message (RSP). A tag or mobile device 901M in the coverage area overhears or otherwise receives both REQ and RSP messages. A TDOA measurement can then be made according to the received REQ and RSP messages. In one embodiment, this can be a DL-TDOA procedure which operates as one TW-TOA ranging procedure between anchor 902A and 902B. In one embodiment in a network, only a fixed number of anchor pairs may be scheduled so only a fixed number of ranging is needed or otherwise performed.

As an example as illustrated in FIG. 20B (see e.g., FIG. 6-48 of IEEE 802.15.4z), an example ranging block structure 925 or portion thereof for ranging block, ranging round and ranging slot can be implemented into a schedule or superframe structure such as with respect to anchor pairs of the system 900. As described herein the schedule or portion thereof (which can include ranging block structure 925) can be delivered or otherwise provisioned in a number of different ways including by a centralized technique such as through use of a server. However, other schedule, ranging block or superframe configurations could also be utilized. Based on the messaging being performed by the various anchor pairs of the system 900, one or more tags or mobile devices can receive both REQ and RSP messages, and a TDOA measurement can then be made according to the received REQ and RSP messages.

For instance, the ranging block structure 925 can be generated for a group of anchors operating as controlees in a location system that is utilized for determining position information for one or more mobile devices; and the ranging block structure 925 can be provisioned to the group of anchors (e.g. by a server) to cause anchor pairs of the group of anchors to wirelessly transmit REQ messages and RSP messages to each other according to the schedule operating as an initiator and a responder, respectively. In this example, the one or more mobile devices would also receive the REQ messages and RSP messages being transmitted between the anchor pairs, and a TDOA measurement can be calculated (e.g., by the one or more mobile devices and/or by another device that is forwarded the information) based on the REQ messages and RSP messages. In one embodiment, the ranging block structure 925 is part of a superframe structure which includes a beacon period, a ranging block, and a contention period. In one embodiment, the ranging block structure 925 includes one or more ranging blocks which each comprise ranging rounds. In one embodiment, each of the ranging rounds can include only a pair of ranging slots for transmitting a pair of REQ and RSP messages between a corresponding anchor pair. In another embodiment, each of the ranging rounds can include more than two ranging slots. In one embodiment, the superframe structure comprises a sync period between the beacon period and the ranging block. In one embodiment, the superframe structure and/or the ranging block structure 925 can also be provisioned to the one or more mobile devices. In one embodiment, anchor pairs can be determined or otherwise selected based at least in part on anchor locations, where the anchor locations are known by a server and by one or more mobile devices. In one embodiment, the one or more mobile devices can include different device types, such as a personal ID, a manually-controlled vehicle, and so forth.

Figure 21A:
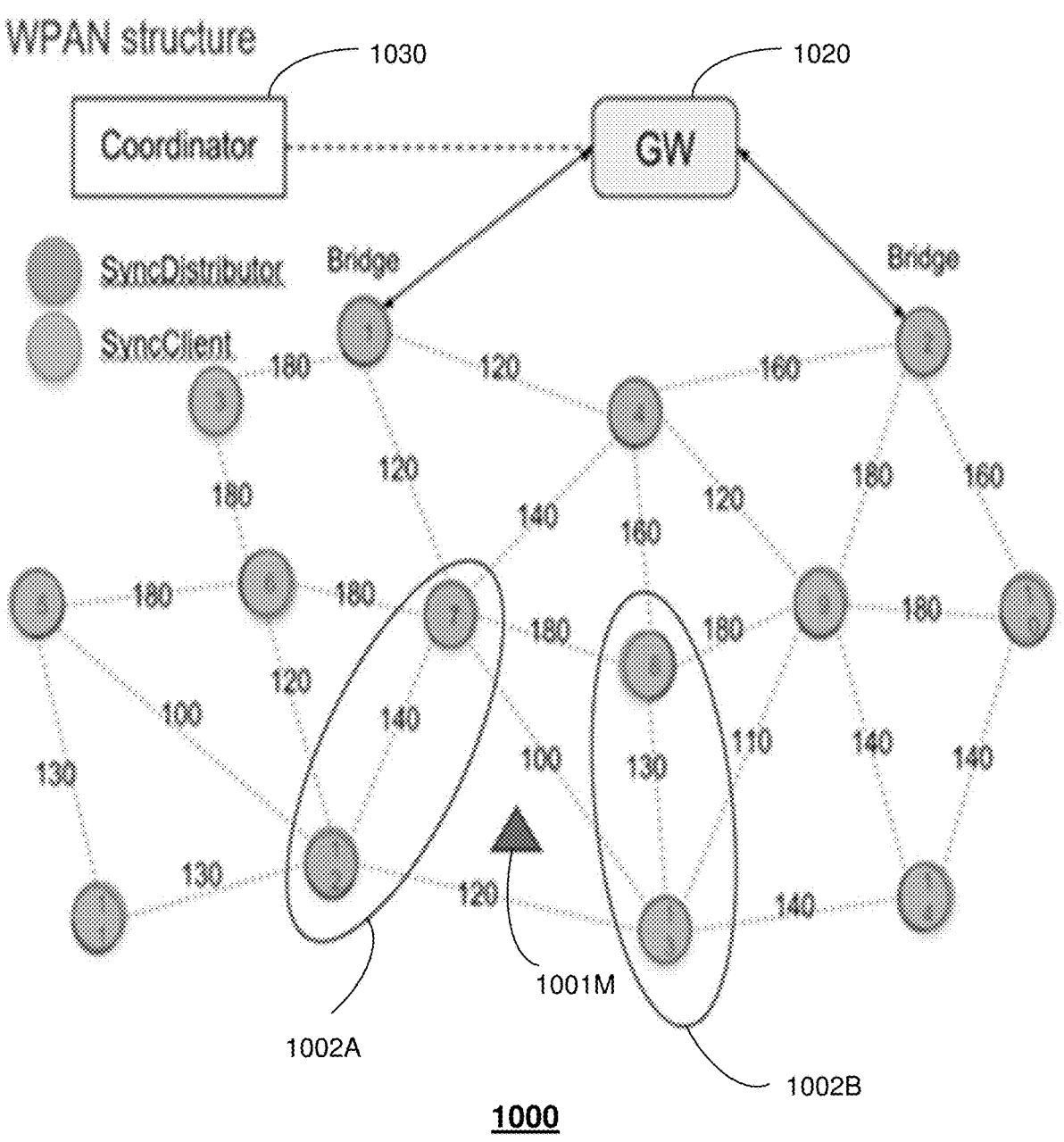
FIGS. 21A-21C are block diagrams illustrating an exemplary, non-limiting embodiment for determining location information of mobile tags using a particular frame structure in accordance with various aspects described herein.

As an example as illustrated in FIG. 21A, a network 1000 can provide location services to mobile devices in its coverage area. The network 1000 can be various types of networks that are capable of wireless communications, including a WPAN. A selection of SyncDistributors can enable any radio device in the network to hear one or more beacons from the SyncDistributors. In one embodiment, a radio device uses the information in the beacon(s) to adjust a local system clock, as set forth in more detail in U.S. application Ser. No. 17/181,286 filed on Feb. 22, 2021, the disclosure of which is hereby incorporated by reference herein.

Network 1000 can include a coordinator/server 1030 and a group of radio devices (identified by numbers 1 through 14), which can be anchors, mobile devices and so forth. In one embodiment, the radio devices in the network 1000 are anchors. In another embodiment, where mobile device(s) operate as anchors, then the radio devices can include those particular mobile device(s). In one or more embodiments, the coordinator/server 1030 can communicate with a subset of the radio devices via a gateway 1020, which is being illustrated as a bridge. Network 1000 can enable SyncDistributors and other radio devices to be selected in accordance with various aspects described herein and in U.S. application Ser. No. 17/181,286. In this example, radio devices 1, 2, 4, 7, 10 and 12 can be on the SyncDistributor list, and the remaining radio devices 3, 5, 6, 8, 9, 11, 13 and 14 are not. The numbers on each link illustrate a metric of link quality.

In one embodiment, a schedule can be distributed to the anchors from the coordinator/server (e.g., via the gateway 1020) in various fashions including daisy-chain, where the gateway only propagates the schedule to a subset of the anchors which in turn propagate to other anchors and so forth until all anchors received the schedule. Other techniques for provisioning of the anchors can also be utilized including direct transmissions from the gateway 1020 and/or coordinator/server 1030 to each of the anchors.

As illustrated in this example, a mobile device 1001M can overhear transmissions or messaging between radio device pairs, such as a first pair 1002A (e.g., anchors 7 and 12) and a second pair 1002B (e.g., anchors 8 and 13). These transmissions can then be utilized to calculate a TDOA measurement.

In one embodiment, beacon signals overheard or otherwise received by a mobile device(s) can be used for synchronizing the mobile device(s)'s clock to the network and may or may not be utilized TDOA measurements. In another embodiment, beacon signals overheard or otherwise received by a mobile device(s) can also be used for TDOA measurements.

As another example, network 1000 (e.g., utilizing the coordinator/server 1030 such as via the gateway 1020) can: determine complete neighbor information for a plurality of radio devices in a wireless network, where the complete neighbor information denotes neighboring radio devices; include a first radio device of the plurality of radio devices in a list of radio devices for delivering beacons; determine a set of radio devices in the plurality of radio devices that are not neighboring radio devices of every radio device in the list of radio devices; responsive to an existence of at least one radio device in the set, add an additional radio device from the plurality of radio devices to the list of radio devices, where the additional radio device has at least one neighboring radio device in the list of radio devices and has at least one neighboring radio device in the set; and repeating the determining the set step and the adding step until the set is empty.

In one embodiment, the network 1000 can include any number of anchor pairs (e.g., anchors illustrated as 1 through 14), such as anchor pair 1002A and anchor pair 1002B. The anchors can operate as SyncDistributors and SyncClients, which can be independent of their roles as anchor pairs. In one embodiment, the coordinator/server 1030 (or a group of servers or other computing control system) can be utilized to facilitate management of the location services for any number of mobile devices or tags 1001M (only one of which is shown).

Figure 21B:
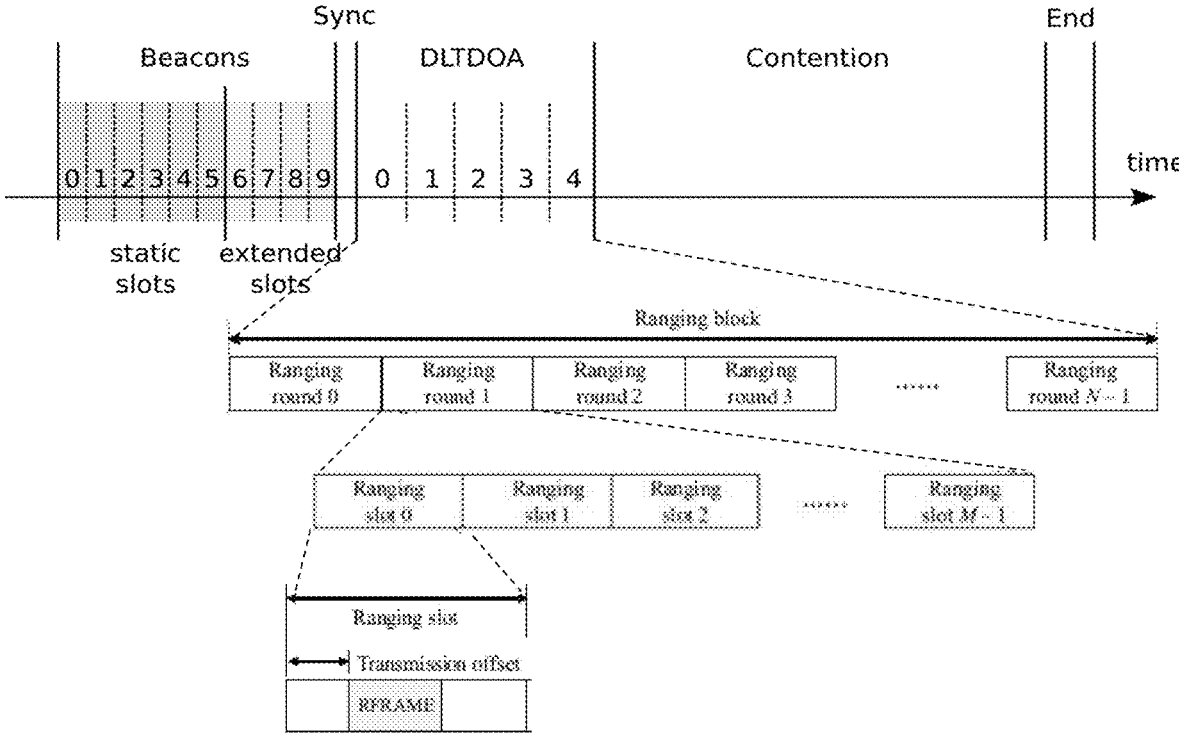

FIG. 21B is a block diagram illustrating an exemplary, non-limiting embodiment of a network frame 1100 that can be utilized by a network in accordance with various aspects described herein. The network frame 1100 can be broken into various portions such as beacon period, sync period, a contention-free period (e.g., DL-TDOA messaging), a contention period, and an end period 518. For instance, the beacons can be generated by anchors to provide anchors and mobile tags a means for synchronization.

Figure 21C:
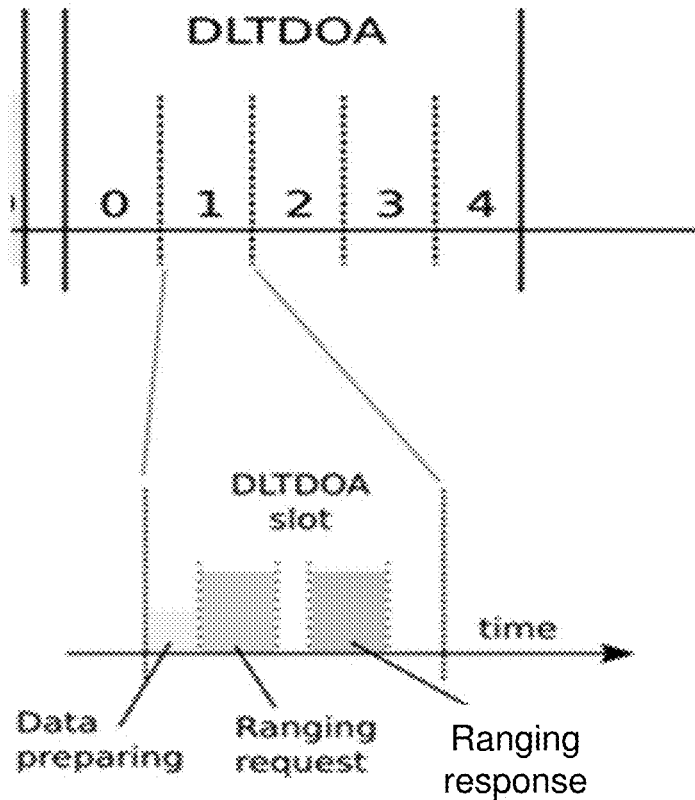

The CFP portion of the frame 1100 supports DL-TDOA ranging packets where the CFP portion can operate as follows: the ranging block can operate as the DL-TDOA period; the ranging round can operate as a DL-TDOA slot; and the ranging slot can operate as the period to transmit REQ or RSP messages. A ranging round may have two ranging slots if there is only one RSP message corresponding to a REQ message. A ranging round may have more than two ranging slots if there are multiple RSP messages (e.g., from different anchors) corresponding to a REQ message. As illustrated in FIG. 21C, each of the DL-TDOA slots for an anchor pair can be broken into a data preparing portion, a ranging request, and a ranging response, where the data preparing portion is in the transmission offset portion in FIG. 21B; the ranging request (REQ) is in the ranging slot 0 in FIG. 21B; and the ranging response (RSP) is in the ranging slot 1 in FIG. 21B.

In one embodiment, the CP portion of the frame 1100 can support UL-TDOA, TW-TOA ranging packets and additional data packets/control signaling packets, and can be subject to simultaneous transmissions that in turn may interfere with each other.

In one or more embodiments, multi-node ranging can be performed whereby a data frame(s) can be utilized that conveys ranging parameters to control and configure aspects of ranging procedures such as a timeslot structure (e.g., shown in FIG. 20B and/or 21B), ranging method(s), and/or packet configuration(s).

In one or more embodiments, multi-node ranging can be performed that complies with and/or is based at least in part on one or more procedures and functions described in IEEE 802.15.4z which defines and/or discusses ranging block and rounds in multi-node ranging modes.

In one or more embodiments, ranging block and rounds can be defined on a server (or more than one server) and sent to corresponding anchors. In these examples, the server(s) would operate as a controller, while the anchors would operate as controlees. Further to these examples, a source anchor (e.g., sending REQ message) would operate as an initiator while a destination anchor (e.g., sending RSP) would operate as a responder.

In one or more embodiments, a particular control scheme can be implemented. As an example as illustrated in FIG. 22A, a portion of a network 1200 can include a server (e.g., controller) which can provision or otherwise provide a schedule(s) to a group of anchors (e.g., controlees) where some of those anchors will operate as initiators that transmit the REQ message while other anchors operate as responders that transmit the RSP message (in response to the REQ message).

In this example, a CFP period structure can be based on ranging block and round concepts, however, in network 1200, the centralized control (scheduling) provided by server 1220 is used to coordinate DL-TDOA transmissions in a large-scale network. This can be compared to the technique depicted in FIG. 22B which shows ranging controller, controlee, initiator and responder discussed in IEEE 802.15.4z. The ranging block and round concept in FIG. 22B is from multi-node ranging which is originally for a local group of devices to organize (two-way) ranging among these devices, and therefore the communication and control model is different from the exemplary embodiment of network 1200 used for DL-TDOA support. In one embodiment, all or a portion of the devices in FIG. 22B (e.g., controller devices) can be provisioned with a schedule, such as schedule/frame 1100, by a centralized server. In one or more embodiments, DL-TDOA or CFP period (to tags/mobile devices) can function as a ranging block that provides two-way rangings between selected and scheduled anchors.

The embodiments of FIGS. 20A-22B can utilize one or more functions and/or devices as described with respect to FIGS. 1-19, including in addition to or in place of the one or more functions and/or devices as described with respect to FIGS. 20A-22B.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:

a processing system including a processor; and a memory that stores executable instructions that, when executed by the processing system, facilitate performance of operations, the operations comprising:

generating a schedule for a group of anchors operating as controlees in a location system that is utilized for determining position information for one or more mobile devices, wherein the schedule is applied in a ranging block, wherein the ranging block includes a plurality of ranging rounds, wherein each ranging round of the plurality of ranging rounds includes two ranging slots, and wherein the schedule directs only a subset of the group of anchors to engage in REQ and RSP messaging;

determining a plurality of anchor pairs of the subset of the group of anchors comprising first anchors and second anchors based at least in part on anchor locations, wherein the anchor locations are known by the server and by the one or more mobile devices; and provisioning the schedule to the group of anchors and to the one or more mobile devices, wherein the provisioning of the schedule causes a plurality of anchor pairs of the subset of the group of anchors to wirelessly transmit REQ messages by the first anchors during respective first ranging slots of the scheduled ranging rounds of the plurality of ranging rounds and to wirelessly transmit RSP messages by the second anchors during respective second ranging slots of the scheduled ranging rounds of the plurality of ranging rounds in response to receiving the REQ messages, wherein the wirelessly transmitting is between each of the first and second anchors of each pair according to the schedule operating as an initiator and a responder, respectively, during a respective ranging round of the plurality of ranging rounds of the ranging block of the schedule, wherein the one or more mobile devices overhear one or more pairs of the REQ messages and RSP messages being transmitted between the plurality of anchor pairs, calculate a TDOA measurement based on the one or more pairs of the REQ messages and RSP messages, and calculate location information based on the TDOA measurement, wherein the location information includes coordinates of the one or more mobile devices within a demarcated area, a speed of travel of the one or more mobile devices over a time period, a trajectory of the one or more mobile devices, and an angular orientation of the one or more mobile devices relative to a second subset of the group of anchors.

2. The server of claim 1, wherein at least one of the one or more mobile devices calculates another TDOA measurement based on beacon signals, and wherein the group of anchors are each stationary anchors.

3. The server of claim 1, wherein the ranging block is part of a superframe structure comprising a beacon period and a contention period wherein the ranging block of the superframe structure comprises the plurality of ranging rounds, wherein the REQ and RSP messaging utilizes a wideband signaling technology, and wherein the schedule allows the one or more mobile devices to activate a wideband receiver according to the schedule.

4. The server of claim 3, wherein each of the ranging rounds includes a pair of ranging slots for transmitting a pair of REQ and RSP messages between a corresponding anchor pair of the plurality of anchor pairs.

5. The server of claim 4, wherein the superframe structure comprises a sync period between the beacon period and the ranging block.

6. The server of claim 1, wherein the group of anchors are fixed location devices.

7. The server of claim 1, wherein the provisioning of the schedule is via a gateway that is in communication with the group of anchors.

8. The server of claim 1, wherein the one or more mobile devices include different device types comprising a personal ID and a manually-controlled vehicle.

9. A non-transitory machine-readable medium comprising executable instructions that, when executed by a processing system including a processor operating from a mobile device, facilitate performance of operations, the operations comprising:

overhearing REQ messages and RSP messages being wirelessly transmitted between each pair of a plurality of anchor pairs of a group of anchors according to a schedule that is generated by and provisioned by a server via a gateway to the group of anchors, wherein the plurality of anchor pairs operate as an initiator and a responder, respectively, in a location system, and wherein the schedule is for a ranging block, wherein the schedule directs only a subset of the group of anchors to engage in REQ and RSP messaging, wherein the ranging block is divided into a plurality of ranging rounds, wherein each ranging round of the plurality of ranging rounds is divided into two ranging slots, wherein each ranging round of the plurality of ranging rounds is dedicated to a respective anchor pair of the subset, and wherein during a first slot of the two ranging slots a respective REQ message is transmitted by a first anchor of the respective anchor pair of the subset and during a second slot of the two ranging slots a respective RSP message is transmitted by a second anchor of the respective anchor pair of the subset;

calculating a TDOA measurement based on the REQ messages and RSP messages; and calculating location information based on the TDOA measurement, wherein the location information includes coordinates of the mobile device within a demarcated area, a speed of travel of the mobile device over a time period, a trajectory of the mobile device, and an angular orientation of the mobile device relative to a second subset of the group of anchors.

10. The non-transitory machine-readable medium of claim 9, wherein at least one mobile device calculates another TDOA measurement based on beacon signals.

11. The non-transitory machine-readable medium of claim 9, wherein the ranging block is part of a superframe structure comprising a beacon period and a contention period, wherein transmitting the REQ messages and the RSP messages is during the ranging block, wherein the ranging block of the superframe structure comprises the plurality of ranging rounds, and wherein each of the ranging rounds includes a pair of ranging slots for transmitting a pair of REQ and RSP messages between a corresponding anchor pair of the plurality of anchor pairs.

12. The non-transitory machine-readable medium of claim 11, wherein the superframe structure comprises a sync period between the beacon period and the ranging block.

13. The non-transitory machine-readable medium of claim 9, wherein the operations further comprise receiving the schedule from the server.

14. The non-transitory machine-readable medium of claim 9, wherein the operations further comprise storing anchor locations for the plurality of anchor pairs, wherein the plurality of anchor pairs of the subset of the group of anchors is determined by the server based at least in part on anchor locations, wherein the anchor locations are known by the server and by the mobile device.

15. A method comprising:

generating, by a server operating as a controller in a locating system, a schedule for a group of anchors operating as controlees in the location system that is utilized for determining position information for one or more mobile devices, wherein the schedule is for a ranging block, wherein the ranging block includes a plurality of ranging rounds, wherein each ranging round of the plurality of ranging rounds includes two ranging slots, and wherein the schedule directs only a subset of the group of anchors to engage in REQ and RSP messaging;

determining a plurality of anchor pairs of the subset of the group of anchors comprising first anchors and second anchors based at least in part on anchor locations, wherein the anchor locations are known by the server and by the one or more mobile devices; and provisioning, by the server, the schedule to the group of anchors to cause the plurality of anchor pairs of the group of anchors to wirelessly transmit REQ messages by the first anchors during a respective first ranging slot and to wirelessly transmit RSP messages by the second anchors during a respective second ranging slot such that each pair of the plurality of anchor pairs includes an initiator and a responder operating during a respective ranging round of the plurality of ranging rounds, wherein the one or more mobile devices overhear the REQ messages and RSP messages being transmitted between the plurality of anchor pairs, calculate a TDOA measurement based on the REQ messages and RSP messages, and calculate location information based on the TDOA measurement, wherein the location information includes coordinates of the one or more mobile devices within a demarcated area, a speed of travel of the one or more mobile devices over a time period, a trajectory of the one or more mobile devices, and an angular orientation of the one or more mobile devices relative to a second subset of the group of anchors.

16. The method of claim 15, wherein at least one of the one or more mobile devices calculates another TDOA measurement based on beacon signals.

17. The method of claim 15, wherein the ranging block is part of a superframe structure comprising a beacon period and a contention period, wherein transmitting the REQ messages and the RSP messages is during the ranging block, wherein the ranging block of the superframe structure comprises the plurality of ranging rounds, and wherein each of the ranging rounds includes a pair of ranging slots for transmitting a pair of REQ and RSP messages between a corresponding anchor pair of the plurality of anchor pairs.

18. The method of claim 17, wherein the superframe structure comprises a sync period between the beacon period and the ranging block.

19. The method of claim 15, further comprising:

provisioning, by the server, the schedule to the one or more mobile devices.

20. The method of claim 15, further comprising:

determining the plurality of anchor pairs based at least in part on anchor locations, wherein the anchor locations are known by the server and by the one or more mobile devices.

* * * * *